United States Patent
Zweigle et al.

(10) Patent No.: US 10,819,883 B2
(45) Date of Patent: Oct. 27, 2020

(54) WEARABLE SCANNING DEVICE FOR GENERATING FLOORPLAN

(71) Applicant: FARO Technologies, Inc., Lake Mary, FL (US)

(72) Inventors: Oliver Zweigle, Stuttgart (DE); Ahmad Ramadneh, Kornwestheim (DE); Muhammad Umair Tahir, Stuttgart (DE); Aleksej Frank, Stuttgart (DE); João Santos, Kornwestheim (DE); Roland Raith, Unterägeri (CH)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 51 days.

(21) Appl. No.: 16/356,209

(22) Filed: Mar. 18, 2019

(65) Prior Publication Data
US 2020/0304690 A1 Sep. 24, 2020

(51) Int. Cl.
| | |
|---|---|
| *H04N 3/14* | (2006.01) |
| *G06F 1/16* | (2006.01) |
| *G06K 9/00* | (2006.01) |
| *G06T 19/00* | (2011.01) |

(52) U.S. Cl.
CPC .......... *H04N 3/1587* (2013.01); *G06F 1/163* (2013.01); *G06K 9/00671* (2013.01); *G06T 19/006* (2013.01); *H04N 3/1562* (2013.01)

(58) Field of Classification Search
CPC .... H04N 3/1587; H04N 3/1562; G06F 1/163; G06K 9/00671; G06T 19/006
See application file for complete search history.

(56) References Cited

U.S. PATENT DOCUMENTS

| | | | |
|---|---|---|---|
| 8,023,727 B2* | 9/2011 | Matsumoto | G06K 9/00691 382/153 |
| 10,282,854 B2 | 5/2019 | Zweigle et al. | |
| 2010/0199232 A1* | 8/2010 | Mistry | G06F 3/0425 715/863 |
| 2014/0016114 A1* | 1/2014 | Lopez | G01C 15/002 356/4.01 |
| 2014/0287806 A1* | 9/2014 | Balachandreswaran | A63F 13/212 463/7 |

(Continued)

OTHER PUBLICATIONS

Gebre, Biruk A., et al., "Remotely Operated and Autonomous Mapping System (ROAMS)", Technologies for Practical Robot Applications, TEPRA 2009, IEEE International Conference on Nov. 9, 2009, pp. 173-178, XP031570394.

*Primary Examiner* — Nicholas G Giles
(74) *Attorney, Agent, or Firm* — Cantor Colburn LLP

(57) ABSTRACT

According to one or more embodiments, a system of generating a two-dimensional (2D) image of an environment includes a 2D scanner system that includes a measurement device that is mounted to a first body equipment of an operator and one or more processors that are mounted to a second body equipment of the operator. The measurement device includes a light source, an image sensor, and a controller to determine a distance value to one or more object points. The processors generate a 2D submap of the environment in response to an activation signal from the operator and based at least in part on the distance value, each submap generated from a respective point in the environment. Further, the processors generate a 2D image of the environment using multiple 2D submaps.

20 Claims, 18 Drawing Sheets

(56) References Cited

U.S. PATENT DOCUMENTS

2016/0291160 A1* 10/2016 Zweigle .................. G01S 17/42
2018/0100927 A1    4/2018 Zweigle
2018/0285482 A1   10/2018 Santos
2018/0315162 A1* 11/2018 Sturm ................... G06T 3/0037

* cited by examiner

WEARABLE SCANNING DEVICE FOR GENERATING FLOORPLAN

BACKGROUND

The present application is directed to a system that optically scans an environment, such as a building, for generating a two-dimensional floorplan of the scanned environment by mapping scanned data of the environment, and in particular to a wearable system for such scanning.

The automated creation of digital two-dimensional floorplans for existing structures is desirable as it allows the size and shape of the environment to be used in many processes. For example, a floorplan may be desirable in search and rescue missions, security missions, army applications, and other such mission critical applications. Such floorplans may find other uses such as in documenting a building for a fire department or to document a crime scene, in the planning of construction or remodeling of a building, and the like. Various other uses of the floorplan can be envisioned.

Existing measurement systems typically use a scanning device that determines coordinates of surfaces in the environment by either, emitting a light and capturing a reflection to determine a distance, or by triangulation using cameras. These scanning device are mounted to a movable structure, such as a cart, and moved through the building to generate a digital representation of the building. These systems tend to be more complex and require specialized personnel to perform the scan. Further, the scanning equipment including the movable structure may be bulky, which could further delay the scanning process in time sensitive situations, such as a crime or accident scene investigation. Further yet, such scanning requires a single scanning equipment to travel along a predetermined path in the environment.

Accordingly, while existing scanners are suitable for their intended purposes, what is needed is a system for having certain features of embodiments of the present invention.

BRIEF DESCRIPTION

According to one or more embodiments, a system of generating a two-dimensional (2D) image of an environment includes a 2D scanner system. The 2D scanner system includes a measurement device that is mounted to a first body equipment of an operator. The measurement device includes a light source, an image sensor, and a controller. The light source steers a beam of light within a first plane to illuminate object points in the environment. The image sensor is arranged to receive light reflected from the object points. The controller is operable to determine a distance value to at least one of the object points. The 2D scanner system further includes one or more processors that are mounted to a second body equipment of the operator. The one or more processors are responsive to non-transitory executable instructions for generating a 2D submap of the environment in response to an activation signal from the operator and based at least in part on the distance value, each submap generated from a respective point in the environment. Further, the one or more processors generate the 2D image of the environment using multiple 2D submaps.

According to one or more embodiments, a method for generating a two-dimensional (2D) image of an environment includes integrating a 2D scanner system into a gear worn by an operator. The 2D scanner system includes a measurement device that is mounted to a first body equipment of an operator. The measurement device comprising a light source, an image sensor, and a controller. The 2D scanner system further includes one or more processors that are mounted to a second body equipment of the operator, the one or more processors are operably coupled to the measurement device. The method further includes moving the measurement device to a plurality of registration positions in the environment. The method further includes sweeping a beam of light, by the measurement device, in a horizontal plane at each of the plurality of registration positions. The method further includes obtaining by the 2D scanner system multiple 2D submaps. Each of the submaps is a set of 2D coordinates of points in the environment. Each of the submaps is collected by the 2D scanner system at a different position relative to a first registration position. The method further includes generating, by the one or more processors, a 2D image of the environment based at least in part on the 2D submaps.

According to one or more embodiments, a computer program product includes a memory device having computer executable instructions stored thereon. The computer executable instructions when executed by one or more processors perform a method to generate a two-dimensional (2D) image of an environment. The method includes integrating a 2D scanner system into a gear worn by an operator. The 2D scanner system includes a measurement device that is mounted to a first body equipment of an operator. The measurement device comprising a light source, an image sensor, and a controller. The 2D scanner system further includes one or more processors that are mounted to a second body equipment of the operator, the one or more processors are operably coupled to the measurement device. The method further includes moving the measurement device to a plurality of registration positions in the environment. The method further includes sweeping a beam of light, by the measurement device, in a horizontal plane at each of the plurality of registration positions. The method further includes obtaining by the 2D scanner system multiple 2D submaps. Each of the submaps is a set of 2D coordinates of points in the environment. Each of the submaps is collected by the 2D scanner system at a different position relative to a first registration position. The method further includes generating, by the one or more processors, a 2D image of the environment based at least in part on the 2D submaps.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The present invention relates to a device that includes a wearable two-dimensional (2D) scanner to generate a 2D map of an environment. The environment can be an interior of a building, a room, a floor, an office, a house, a theater, a stadium, an airport, a bus station, a train station, or any other such closed or partially closed environment. The environment can also include outdoor environment such as a park, a stadium, a parking lot, and the like.

Figure 1:
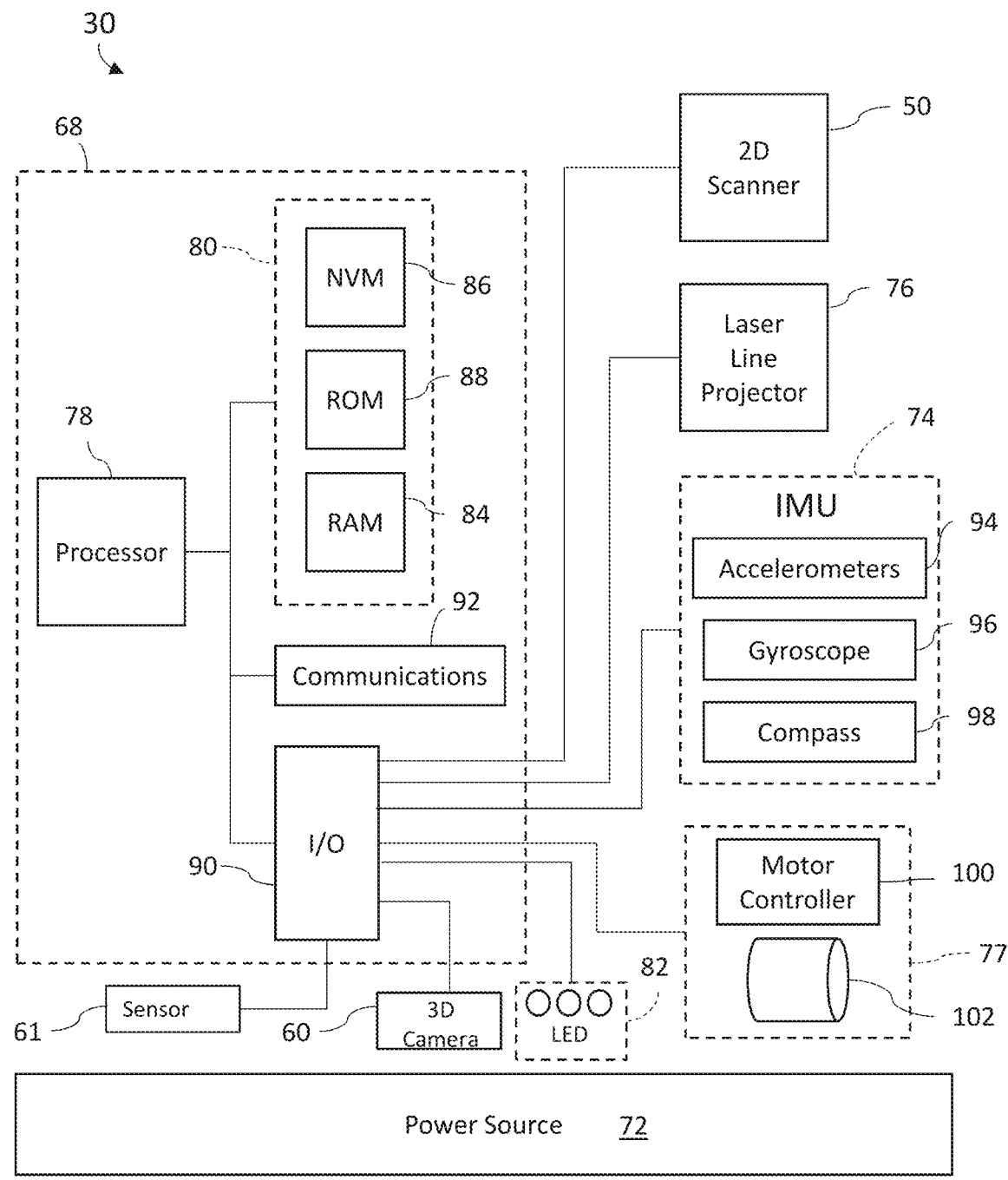
FIG. 1 is a schematic illustration of a system of a scanning and mapping system in accordance with an embodiment.

Referring now to FIG. 1, at least some of the elements of a scanner system 30 are shown. Controller 68 is a suitable electronic device capable of accepting data and instructions, executing the instructions to process the data, and presenting the results. The controller 68 includes one or more processing elements 78. The processors may be microprocessors, field programmable gate arrays (FPGAs), digital signal processors (DSPs), and generally any device capable of performing computing functions. The one or more processors 78 have access to memory 80 for storing information.

Controller 68 is capable of converting the analog voltage or current level provided by 2D scanner 50, 3D camera 60 and IMU 74 into a digital signal to determine a distance from the system 30 to an object in the environment. Controller 68 uses the digital signals that act as input to various processes for controlling the system 30. The digital signals represent one or more system 30 data including but not limited to distance to an object, images of the environment, acceleration, pitch orientation, yaw orientation and roll orientation.

In general, controller 68 accepts data from 2D scanner 50 and IMU 74 and is given certain instructions for the purpose of generating a two-dimensional map of a scanned environment. Controller 68 provides operating signals to the 2D scanner 50, the 3D camera 60, laser line projector 76 and haptic feedback device 77. Controller 68 also accepts data from IMU 74, indicating, for example, whether the operator is operating in the system in the desired orientation. The controller 68 compares the operational parameters to predetermined variances (e.g. yaw, pitch or roll thresholds) and if the predetermined variance is exceeded, generates a signal that activates the haptic feedback device 77. The data received by the controller 68 may be displayed on a user interface coupled to controller 68. The user interface may be one or more LEDs (light-emitting diodes) 82, an LCD (liquid-crystal diode) display, a CRT (cathode ray tube) display, or the like. A keypad may also be coupled to the user interface for providing data input to controller 68. In one embodiment, the user interface is arranged or executed on a mobile computing device that is coupled for communication, such as via a wired or wireless communications medium (e.g. Ethernet, serial, USB, Bluetooth™ or WiFi) for example, to the system 30.

The controller 68 may also be coupled to external computer networks such as a local area network (LAN) and the Internet. A LAN interconnects one or more remote computers, which are configured to communicate with controller 68 using a well-known computer communications protocol such as TCP/IP (Transmission Control Protocol/Internet(ˆ) Protocol), RS-232, ModBus, LTE, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 78 are coupled to memory 80. The memory 80 may include random access memory (RAM) device 84, a non-volatile memory (NVM) device 86, and a read-only memory (ROM) device 88. In addition, the processors 78 may be connected to one or more input/output (I/O) controllers 90 and a communications circuit 92. In an embodiment, the communications circuit 92 provides an interface that allows wireless or wired communication with one or more external devices or networks, such as the LAN discussed above.

Controller 68 includes operation control methods embodied in application code (illustrated by one or more flowcharts herein). These methods are embodied in computer instructions written to be executed by processors 78, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Coupled to the controller 68 is the 2D scanner 50. The 2D scanner 50 measures 2D coordinates in a plane. In the exemplary embodiment, the scanning is performed by steering light within a plane to illuminate object points in the environment. The 2D scanner 50 collects the reflected (scattered) light from the object points to determine 2D coordinates of the object points in the 2D plane. In an embodiment, the 2D scanner 50 scans a spot of light over an angle while at the same time measuring an angle value and corresponding distance value to each of the illuminated object points.

Examples of 2D scanners 50 include, but are not limited to Model LMS100 scanners manufactured by Sick, Inc of Minneapolis, Minn. and scanner Models URG-04LX-UG01 and UTM-30LX manufactured by Hokuyo Automatic Co., Ltd of Osaka, Japan. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. It should be appreciated that the above 2D scanners are exemplary and other types of 2D scanners are also available.

In an embodiment, the 2D scanner 50 is oriented so as to scan a beam of light over a range of angles in a generally horizontal plane (relative to the floor of the environment being scanned). At instants in time the 2D scanner 50 returns an angle reading and a corresponding distance reading to provide 2D coordinates of object points in the horizontal plane. In completing one scan over the full range of angles, the 2D scanner returns a collection of paired angle and distance readings. As the system 30 is moved from place to place, the 2D scanner 50 continues to return 2D coordinate values. These 2D coordinate values are used to locate the position of the system 30 thereby enabling the generation of a two-dimensional map or floorplan of the environment.

Also coupled to the controller 68 is the IMU 74. The IMU 74 is a position/orientation sensor that may include accelerometers 94 (inclinometers), gyroscopes 96, a magnetometers or compass 98, and altimeters. In an exemplary embodiment, the IMU 74 includes multiple accelerometers 94 and gyroscopes 96. The compass 98 indicates a heading based on changes in magnetic field direction relative to the earth's magnetic north. The IMU 74 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 74 determines the pose or orientation of the system 30 about three-axis to allow a determination of a yaw, roll and pitch parameter.

Figure 2:
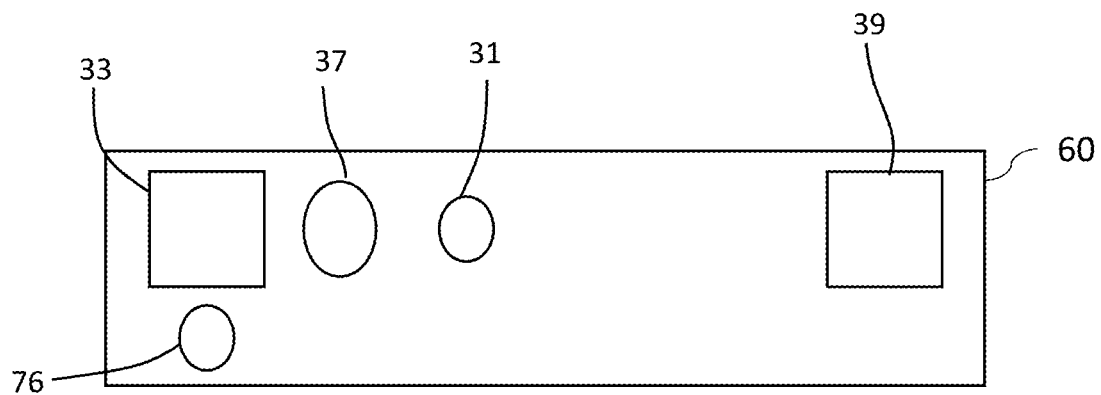
FIG. 2 is a schematic illustration of a camera that is used by a scanning system according to one or more embodiments.

In embodiment, the system 30 further includes a 3D camera 60. As used herein, the term 3D camera refers to a device that produces a two-dimensional image that includes distances to a point in the environment from the location of system 30. The 3D camera 60 may be a range camera or a stereo camera. In an embodiment, the 3D camera 60 includes an RGB-D sensor that combines color information with a per-pixel depth information. In an embodiment, the 3D camera 60 may include an infrared laser projector 31 (FIG. 2), a left infrared camera 33, a right infrared camera 39, and a color camera 37. In an embodiment, the 3D camera 60 is a RealSense™ camera model R200 manufactured by Intel Corporation.

In one or more examples, the system 30 further includes one or more sensors 61 such as for occupancy detection, proximity, motion, and the like. The sensors 61 can use ultrasound, thermal imaging, radio waves, or any other such techniques to determine if an object, such as a wall, a chair, a table, or any other object is present within a predetermined distance from the scanning system 30. Further, in one or more examples, the sensors 61 can detect motion within a predetermined distance from the scanning system 30. For example, a sensor 61 includes a thermal imaging system that uses infrared sensing that detects if an object exists within a predetermined distance from the system 30. The controller 68 receives a signal from the sensors 61 indicating one or more outputs and/or measurements of the sensor 61.

Referring back to FIG. 1, the controller 68 is electrically coupled to the 2D scanner 50, the 3D camera 60, one or more sensors 61, a power source 72, an inertial measurement unit (IMU) 74, a laser line projector 76, and a haptic feedback device 77.

Figure 3:
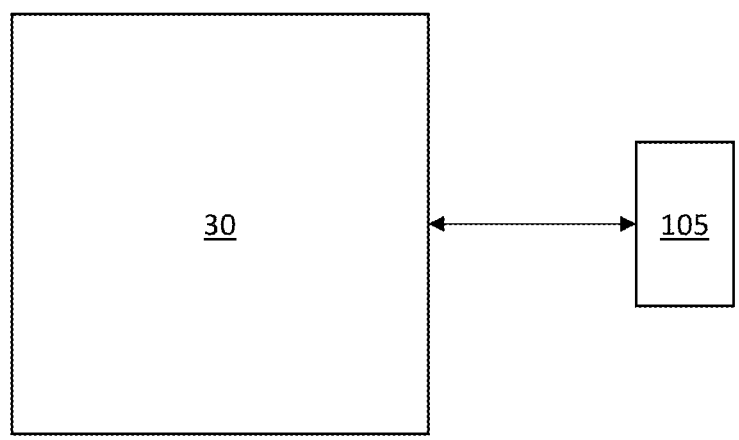
FIG. 3 is a schematic illustration of a scanning system according to one or more embodiments.

Referring now to FIG. 3, in one or more examples, a computing device 105, for example, a cellular phone, a tablet computer, a laptop computer, a watch, a wearable device, or the like, provides a user interface that allows an operator to initiate the functions and control methods described herein. The computing device 105 can communicate with the system 30 in a wired or wireless manner. For example, the computing device 105 is coupled with the system 30 using a wired connection that operates using a communication protocol such as Universal Serial Bus (USB) or the like. Alternatively, or in addition, the computing device 105 communicates with the system 30 using a wireless communication protocol such as Bluetooth™, WiFi™, Near Field Communication, and any other wireless communication protocol(s). Alternatively, or in addition, the operator can interact with the system 30 via a user interface that can include a touch sensitive area and/or one or more physical buttons, rotors etc. on the surfaces of the one or more components of the system 30.

Figure 4:
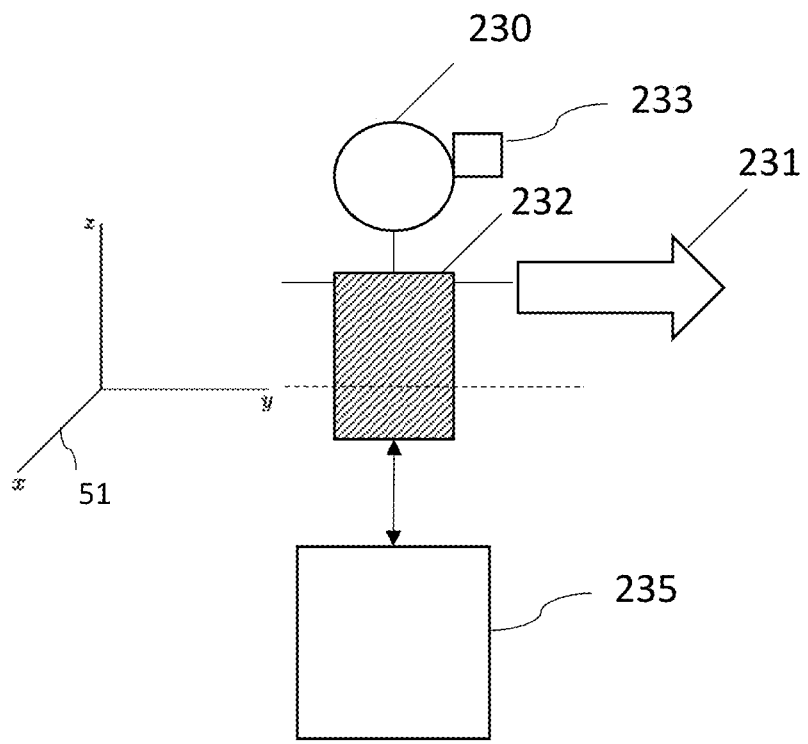
FIG. 4 and FIG. 5 are schematic illustration of a scanning system being integrated into one or more body equipment so that the scanning system is wearable by an operator according to one or more embodiments.
Figure 5:
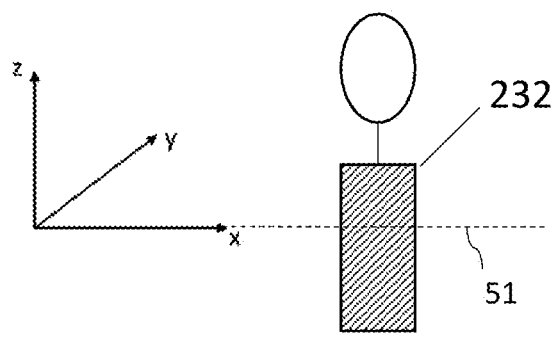

FIG. 4 depicts a wearable scanning system 30 according to one or more embodiments. An operator 230 is depicted with headgear 233, body equipment 232, and carrying a hand equipment 231. The headgear 233 can include a hat, a helmet, a goggle, a mouthpiece, and other such equipment that the operator 230 wears on his/her head/face. The body equipment 232 can include a body vest, armor, belt, boots, clothes, backpack, and other such equipment that the operator 230 carries/wears on his/her body. The hand equipment 231 can include a firearm, a glove, a hose, a shield, a baton, and other such equipment that the operator carries in his/her hands. It is understood that the above are just few examples of equipment and that other examples are possible.

In one or more examples, the body equipment 232 includes one or more components of the scanning system 30. For example, the body equipment is mounted with sensors, such as the 2D scanner 50, the camera 60, and the IMU 74. Alternatively, or in addition, the body equipment 232 is further mounted with a thermal camera, and the laser line projector 76. The sensors can be located together in one position on the on the body equipment 232. Alternatively, a subset of the sensors can be located at a first position (e.g. first shoulder, middle of torso) and another subset of the sensors can be located at a second position (e.g. second shoulder, belt etc.) of the body equipment 232. It should be noted that in one or more examples the sensors can be divided into more than two subsets and located at corresponding locations on the body equipment 232. For example, the 2D scanner 50 and the IMU 74 are located on a first shoulder and the camera 60 and the thermal camera are located on a second shoulder.

Alternatively, or in addition, the sensors are also located on the hand equipment 231, for example, mounted on the firearm, a firehose, a shield, and the like.

One or more sensors, such as the camera 60 can also be located in the headgear 233, such as integrated with the goggle or mounted on the helmet, and the like. In one or more examples, the headgear 233 can also include a virtual reality or an augmented reality headset, such as the HOLO-LENS™.

Further, in one or more examples, the controller 68 and the power source 72 are included in the backpack, the belt, or other equipment (231, 232, and 233) of the operator 230. In one or more examples, the controller 68 processes the scanned data from the one or more sensors mounted on the operator 230 locally. A map of a portion of the environment that the operator 230 is traveling in is created by the controller 68 and displayed to the operator 230 via the headgear 233.

In addition, or alternatively, the controller 68 transmits the scanned data, the generated submaps, and/or both to a central processor 235. The central processor 235 generates a floorplan for the environment based on scanned data and/or submaps received from the system 30 that is integrated with the equipment being carried by the operator 230. In one or more examples, the central processor 235 can communicate with multiple scanning systems 30. For example, the communication can be performed using a mesh network where the scanning systems 30 and the central processor 235 form the mesh network. Alternatively, or in addition, the central processor 235 communicates with the scanning systems 30 via a wireless network such as a Long-Term Evolution (LTE) network (5G/4G/3G etc.) a WI-FI™ network, or any other such communication protocol. The central processor 235 generates a floorplan using scanned data from the multiple scanning systems 30 by combining the submaps generated from the scanned data from the respective scanning systems 30. In one or more examples, the system 30 is integrated in the equipment, such as 232 in a manner that a front of the 2D scanner 50 (and other sensor devices such as the camera 60) is oriented in the direction in which the operator 230 is facing. It is understood that the system 30 can be integrated facing another direction in other examples.

The system 30 being a portable device that is sized and weighted to be worn and carried by a single person (operator 230) during operation with various components integrated into different elements of the worn gear, the plane 51 (FIG. 4/5) in which the 2D scanner 50 projects a light beam may not be horizontal relative to the floor or may continuously change as the operator 230 moves during the scanning process. Thus, the signals generated by the accelerometers 94, gyroscopes 96 and compass 98 may be used to determine the pose (yaw, roll, tilt) of the system 30 and determine the orientation of the plane 51.

In an embodiment, it may be desired to maintain the pose of the system 30 (and thus the plane 51) within predetermined thresholds relative to the yaw, roll and pitch orientations of the system 30. In an embodiment, a haptic feedback device 77 is disposed within the equipment 232 (or 231/233). The haptic feedback device 77 is a device that creates a force, vibration or motion that is felt or heard by the operator 230. The haptic feedback device 77 may be, but is not limited to: an eccentric rotating mass vibration motor or a linear resonant actuator for example. The haptic feedback device is used to alert the operator 230 that the orientation of the light beam from 2D scanner 50 is equal to or beyond a predetermined threshold. In operation, when the IMU 74 measures an angle (yaw, roll, pitch or a combination thereof), the controller 68 transmits a signal to a motor controller 100 that activates a vibration motor 102. In one or more examples, the haptic feedback device is integrated with the equipment 231 that is in the hands of the operator 230. In one or more examples, a notification can also be sent for the operator 230 via the computing device 105. The notification can be a vibration in case of the computing device 105. Alternatively, or in addition, the notification can include an audio and/or visual notification. The notification such as the vibration continues until the system 30 is oriented within the predetermined threshold or the operator requests stopping the scan. In an embodiment, it is desired for the plane 51 to be within 10-15 degrees of horizontal (relative to the ground) about the yaw, roll and pitch axes.

Figure 6:
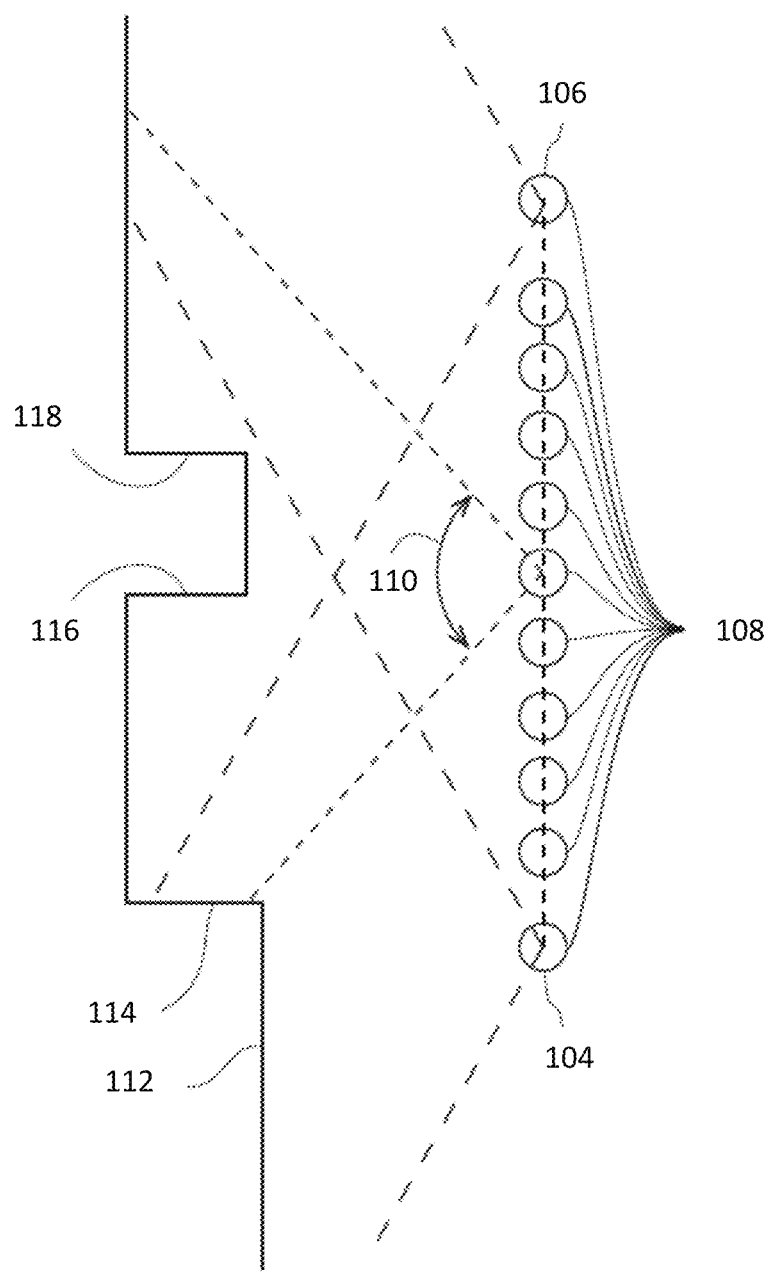
FIGS. 6-8 are plan views of stages of a two-dimensional map generated in accordance with an embodiment.

In an embodiment, the 2D scanner 50 makes measurements as the system 30 is moved about an environment, such as from a first position 104 to a second registration position 106 as shown in FIG. 6. In an embodiment, 2D scan data is collected and processed as the system 30 passes through a plurality of 2D measuring positions 108. At each measuring position 108, the 2D scanner 50 collects 2D coordinate data over an effective FOV 110. Using methods described in more detail below, the controller 68 uses 2D scan data from the plurality of 2D scans at positions 108 to determine a position and orientation of the system 30 as it is moved about the environment. In an embodiment, the common coordinate system is represented by 2D Cartesian coordinates x, y and by an angle of rotation 9 relative to the x or y axis. In an embodiment, the x and y axes lie in the plane of the 2D scanner and may be further based on a direction of a "front" of the 2D scanner 50.

Figure 10:
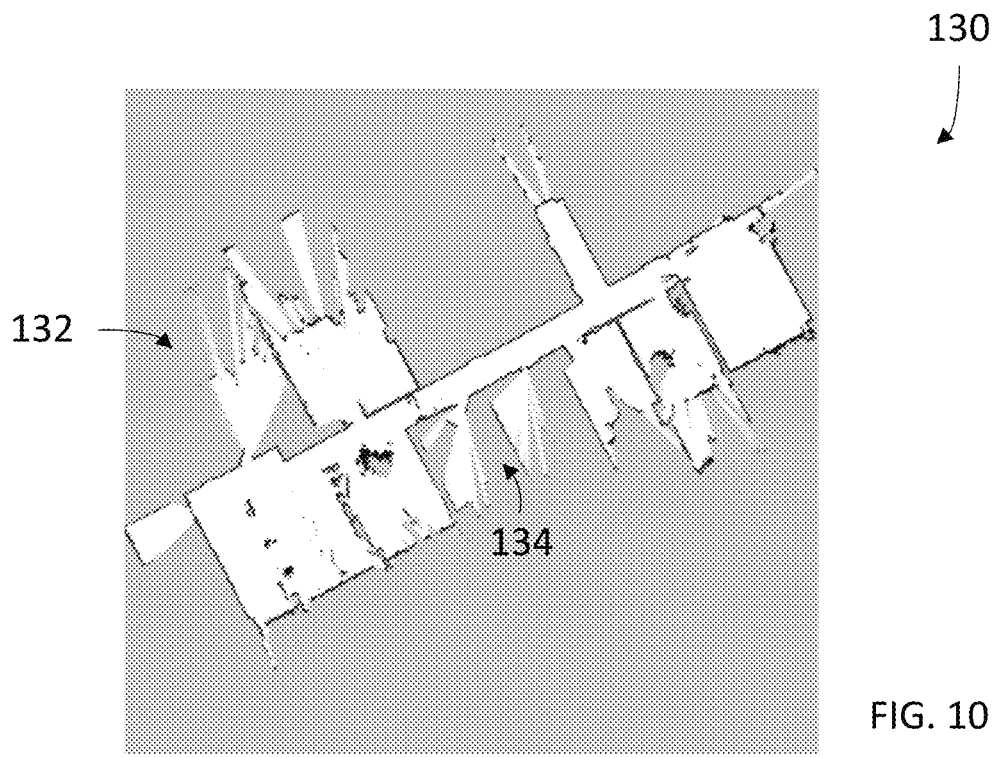
FIG. 10-13 are plan views of stages of a two-dimensional map generated with the method of FIG. 9 in accordance with an embodiment.

FIG. 6 shows the 2D system 30 collecting 2D scan data at selected positions 108 over an effective FOV 110. At different positions 108, the 2D scanner 50 captures a portion of the object 112 marked A, B, C, D, and E. FIG. 10 shows 2D scanner 50 moving in time relative to a fixed frame of reference of the object 112.

Figure 7:
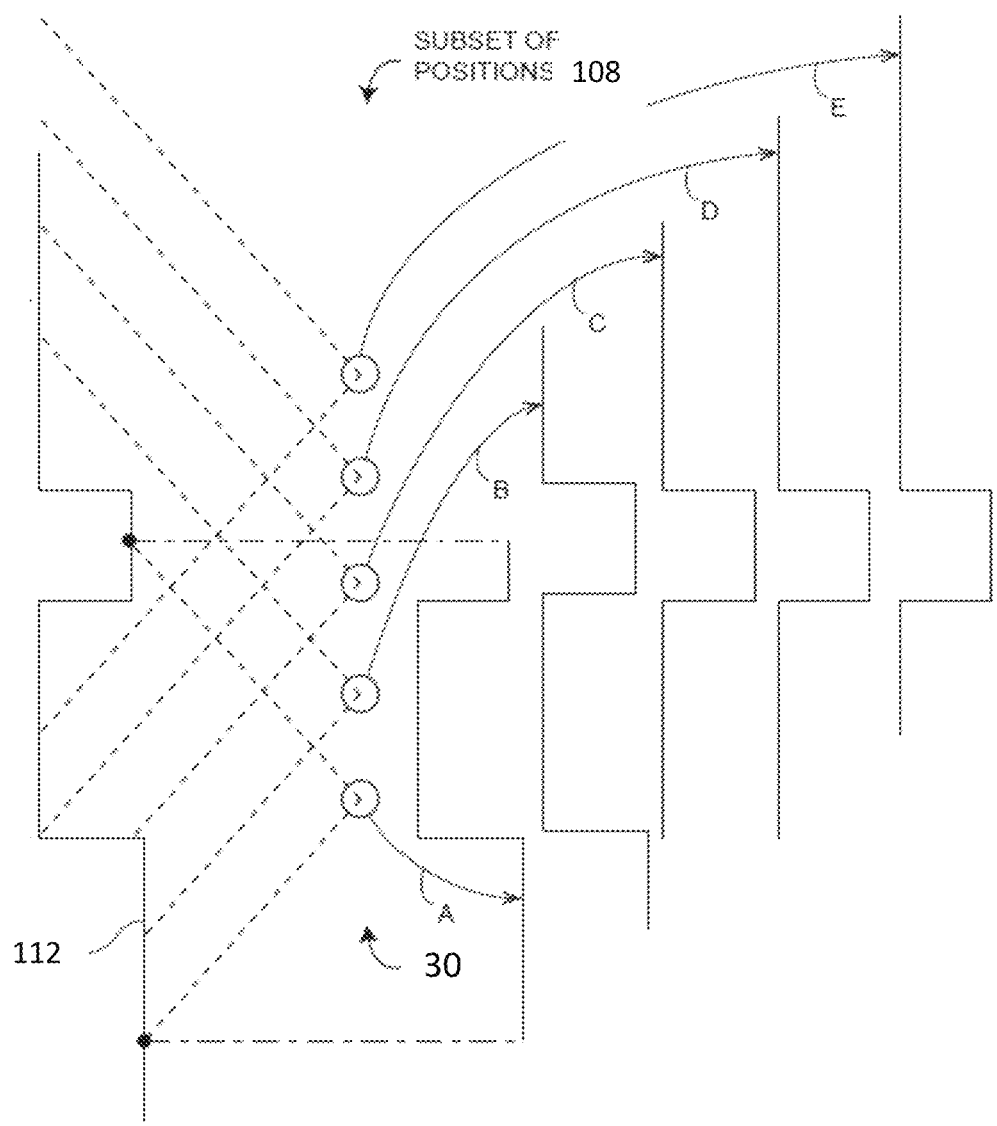
Figure 8:
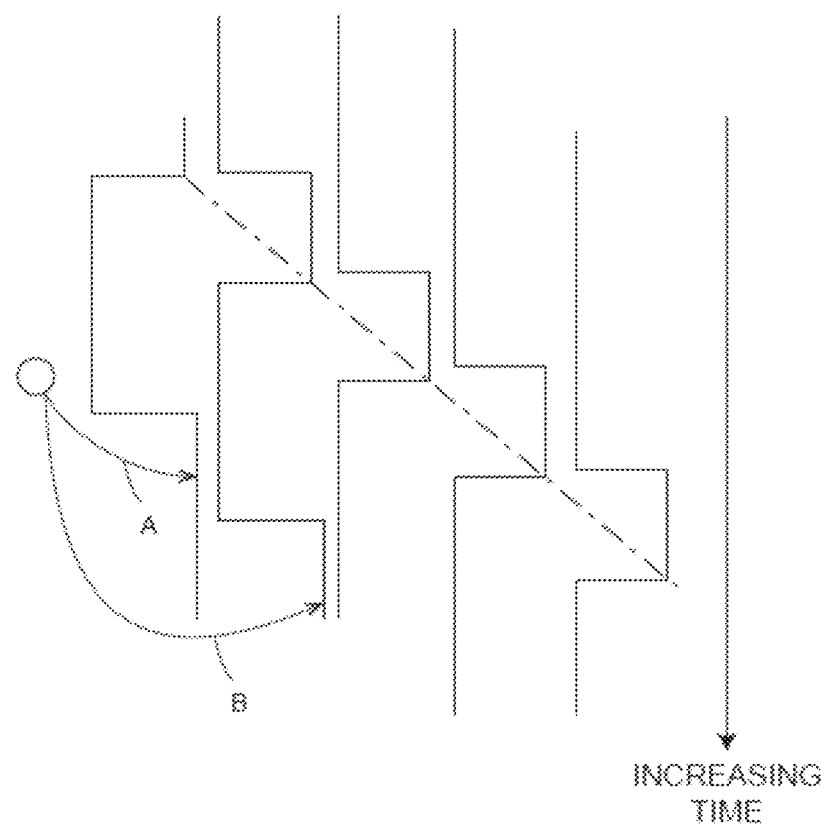

FIG. 8 includes the same information as FIG. 7 but shows it from the frame of reference of the system 30 rather than the frame of reference of the object 112. FIG. 8 illustrates that in the system's frame of reference, the position of features on the object change over time. Therefore, the distance traveled by the system 30 can be determined from the 2D scan data sent from the 2D scanner 50 to the controller 68.

As the 2D scanner 50 takes successive 2D readings and performs best-fit calculations, the controller 68 keeps track of the translation and rotation of the 2D scanner 50, which is the same as the translation and rotation of the system 30. In this way, the controller 68 is able to accurately determine the change in the values of x, y, 9 as the system 30 moves from the first position 104 to the second position 106.

In an embodiment, the controller 68 is configured to determine a first translation value, a second translation value, along with first and second rotation values (yaw, roll, pitch) that, when applied to a combination of the first 2D scan data and second 2D scan data, results in transformed first 2D data that closely matches transformed second 2D data according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. An example of an "objective mathematical criterion" is that of minimizing the sum of squared residual errors for those portions of the scan data determined to overlap. Another type of objective mathematical criterion may involve a matching of multiple features identified on the object. For example, such features might be the edge transitions 114, 116, and 118 shown in FIG. 6. The mathematical criterion may involve processing of the raw data provided by the 2D scanner 50 to the controller 68, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008, which is incorporated by reference herein.

In an embodiment, assuming that the plane 51 of the light beam from 2D scanner 50 remains horizontal relative to the ground plane, the first translation value is dx, the second translation value is dy, and the first rotation value dθ. If the first scan data is collected with the 2D scanner 50 having translational and rotational coordinates (in a reference coordinate system) of $(x_1, y_1, \theta_1)$, then when the second 2D scan data is collected at a second location the coordinates are given by $(x_2, y_2, \theta_2)=(x_1+dx, y_1+dy, \theta_1+d\theta)$. In an embodiment, the controller 68 is further configured to determine a third translation value (for example, dz) and a second and third rotation values (for example, pitch and roll). The third translation value, second rotation value, and third rotation value may be determined based at least in part on readings from the IMU 74.

The 2D scanner 50 collects 2D scan data starting at the first position 104 and more 2D scan data at the second position 106. In some cases, these scans may suffice to determine the position and orientation of the system 30 at the second position 106 relative to the first position 104. In other cases, the two sets of 2D scan data are not sufficient to enable the controller 68 to accurately determine the first translation value, the second translation value, and the first rotation value. This problem may be avoided by collecting 2D scan data at intermediate scan positions 108. In an embodiment, the 2D scan data is collected and processed at regular intervals, for example, once per second. In this way, features in the environment are identified in successive 2D scans at positions 108. In an embodiment, when more than two 2D scans are obtained, the controller 68 may use the information from all the successive 2D scans in determining the translation and rotation values in moving from the first position 104 to the second position 106. In another embodiment, only the first and last scans in the final calculation, simply using the intermediate 2D scans to ensure proper correspondence of matching features. In most cases, accuracy of matching is improved by incorporating information from multiple successive 2D scans.

It should be appreciated that as the system 30 is moved beyond the second position 106, a two-dimensional image or map of the environment being scanned may be generated.

Figure 9:
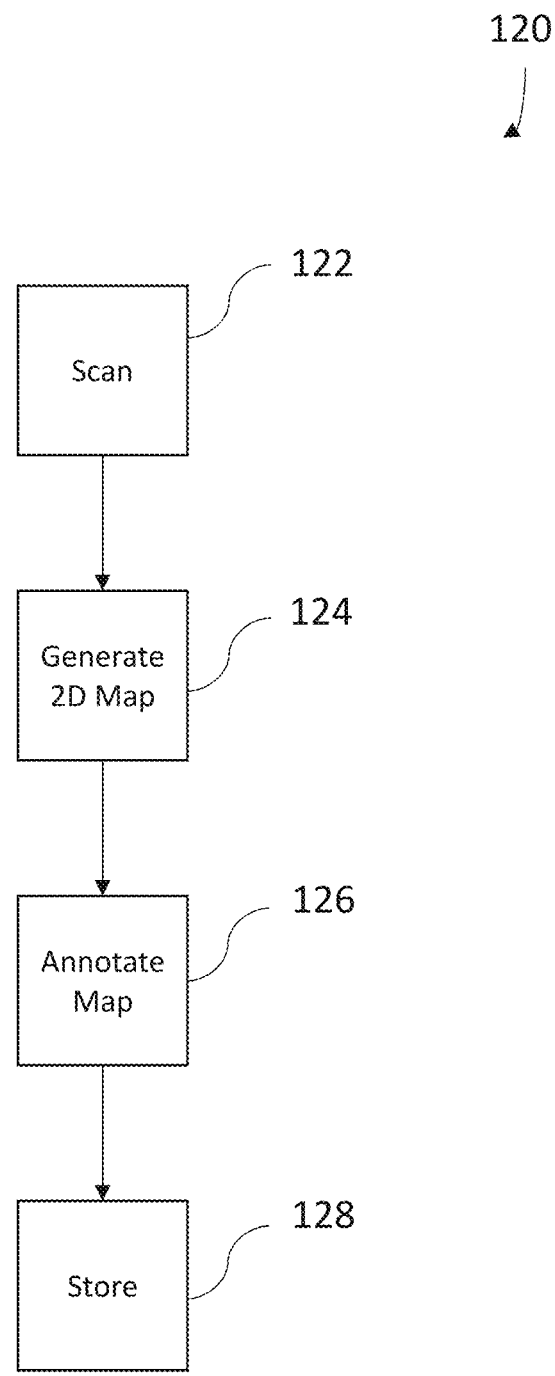
FIG. 9 is a flow diagram of a method of generating a two-dimensional map with annotations in accordance with an embodiment.

Referring now to FIG. 9, a method 120 is shown for generating a two-dimensional map with annotations using a single scanning system 30. The method 120 starts in block 122 where the facility or area is scanned to acquire scan data 130, such as that shown in FIG. 10. The scanning is performed by carrying the system 30 through the area to be scanned by wearing the equipment 231, 232, and 233. The system 30 measures distances from the system 30 to an object, such as a wall for example, and also a pose of the system 30. In an embodiment the operator 230 interacts with the system 30 via an actuator or other physical interface of the system 30, or via the computing device 105. Using the registration process desired herein, the two dimensional locations of the measured points on the scanned objects (e.g. walls, doors, windows, cubicles, file cabinets etc.) are determined. It is noted that the initial scan data may include artifacts, such as data that extends through a window 132 or an open door 134 for example. Therefore, the scan data 130 may include additional information that is not desired in a 2D map or layout of the scanned area.

Figure 11:
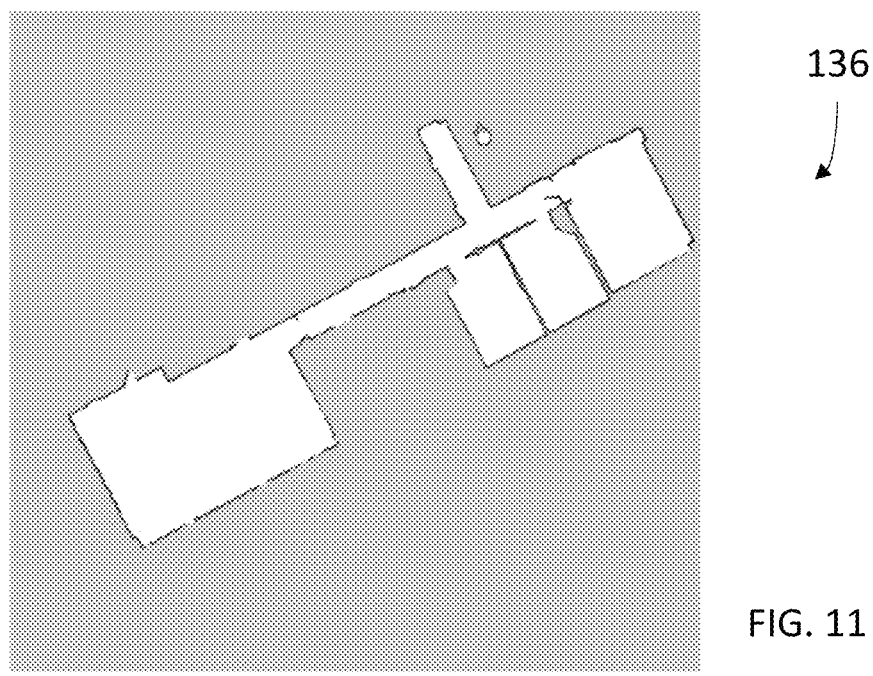
Figure 12:
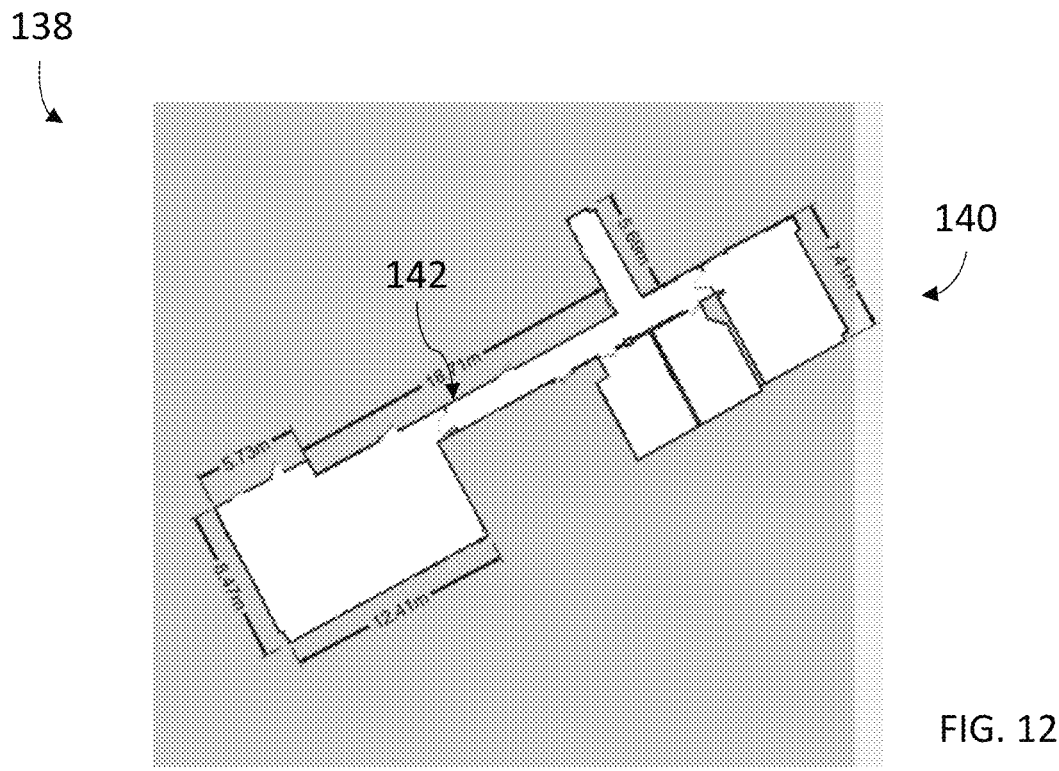
Figure 13:
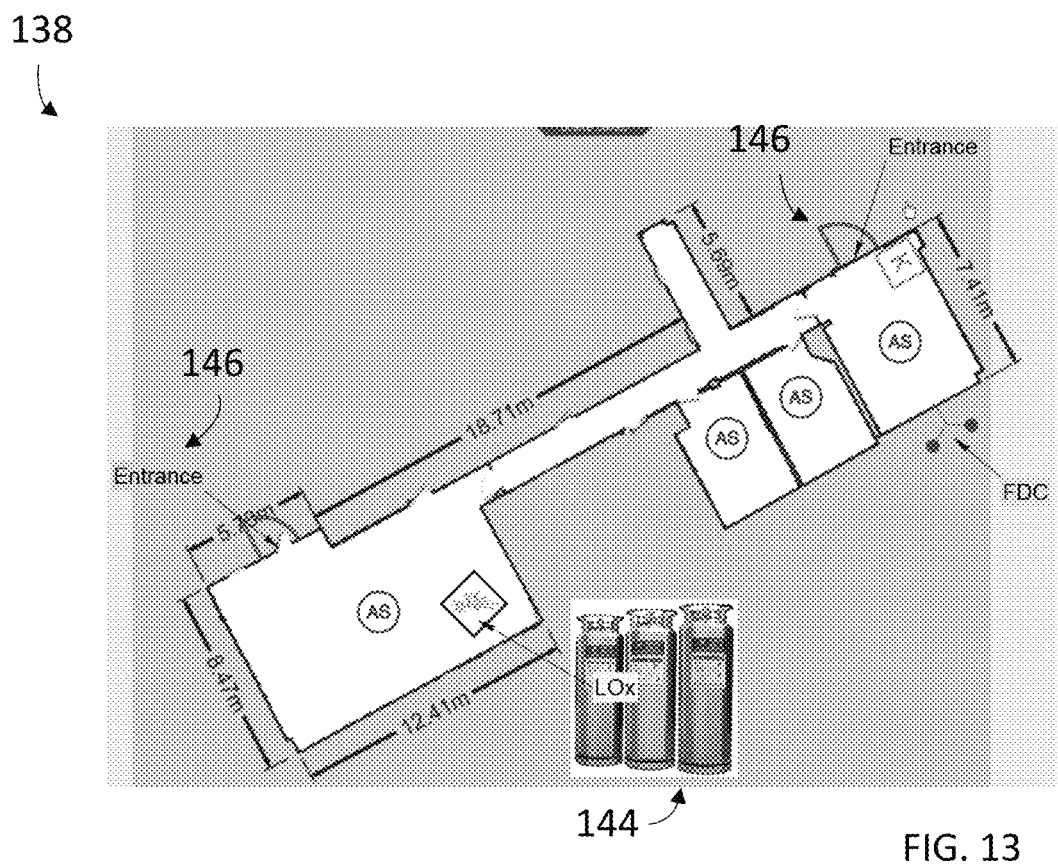

The method 120 then proceeds to block 124 where a 2D map 136 is generated of the scanned area as shown in FIG. 11. The generated 2D map 136 represents a scan of the area, such as in the form of a floor plan without the artifacts of the initial scan data. It should be appreciated that the 2D map 136 may be utilized directly by an architect, interior designer or construction contractor as it represents a dimensionally accurate representation of the scanned area. The method 120 then proceeds to block 126 where user-defined annotations are made to the 2D maps 136 to define an annotated 2D map 138 (FIG. 12 and FIG. 13) that includes information, such as dimensions of features 140, the location of doors 142, the relative positions of objects (e.g. liquid oxygen tanks 144, entrances/exits or egresses 146 or other notable features such as but not limited to the location of automated sprinkler system ("AS"), knox or key boxes ("K"), or fire department connection points ("FDC"). In some geographic regions, public safety services such as fire departments may keep records of building or facility layouts for use in case of an emergency as an aid to the public safety personnel in responding to an event. It should be appreciated that these annotations may be advantageous in alerting the public safety personnel to potential issues they may encounter when entering the facility, and also allow them to quickly locate egress locations.

Once the annotations of the 2D annotated map 138 are completed, the method 120 then proceeds to block 128 where the 2D annotated map 138 is stored in memory, such as nonvolatile memory 80 for example. The 2D annotated map 138 may also be stored in a network accessible storage device or server so that it may be accessed by the desired personnel.

Figure 14:
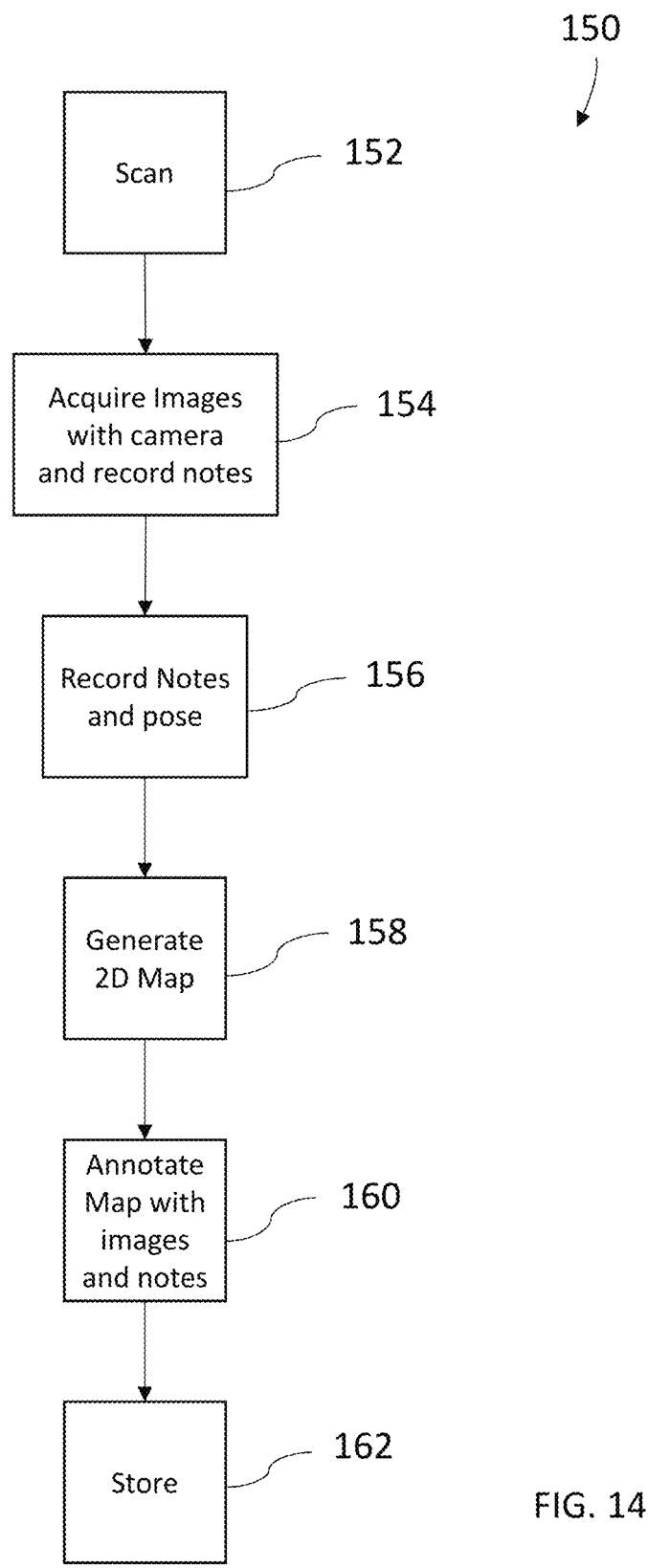
FIG. 14 is a flow diagram of a method of generating a two-dimensional map with annotations in accordance with an embodiment.

Referring now to FIG. 14, another method 150 is shown for generating a 2D map or layout. In this embodiment, the method 150 starts in block 152 with the operator initiating the scanning of an area or facility with the system 30 as described herein. The method 150 then proceeds to block 154 wherein the operator acquires images with a camera during the scanning process. The images may be acquired by a camera located in a mobile computing device (e.g. personal digital assistant, cellular phone, tablet or laptop) carried by the operator for example. In an embodiment, the system 30 may include a holder (not shown) that couples the mobile computing device to the system 30. In block 154, the operator may further record notes. These notes may be audio notes or sounds recorded by a microphone in the mobile computing device. These notes may further be textual notes input using a keyboard on the mobile computing device. It should be appreciated that the acquiring of images and recording of notes may be performed simultaneously, such as when the operator acquires a video. In an embodiment, the recording of the images or notes may be performed using a software application executed on a processor of the mobile computing device. The software application may be configured to communicate with the system 30, such as by a wired or wireless (e.g. Bluetooth™) connection for example, to transmit the acquired images or recorded notes to the system 30. In one embodiment, the operator may initiate the image acquisition by actuating actuator 38 that causes the software application to transition to an image acquisition mode.

Figure 15:
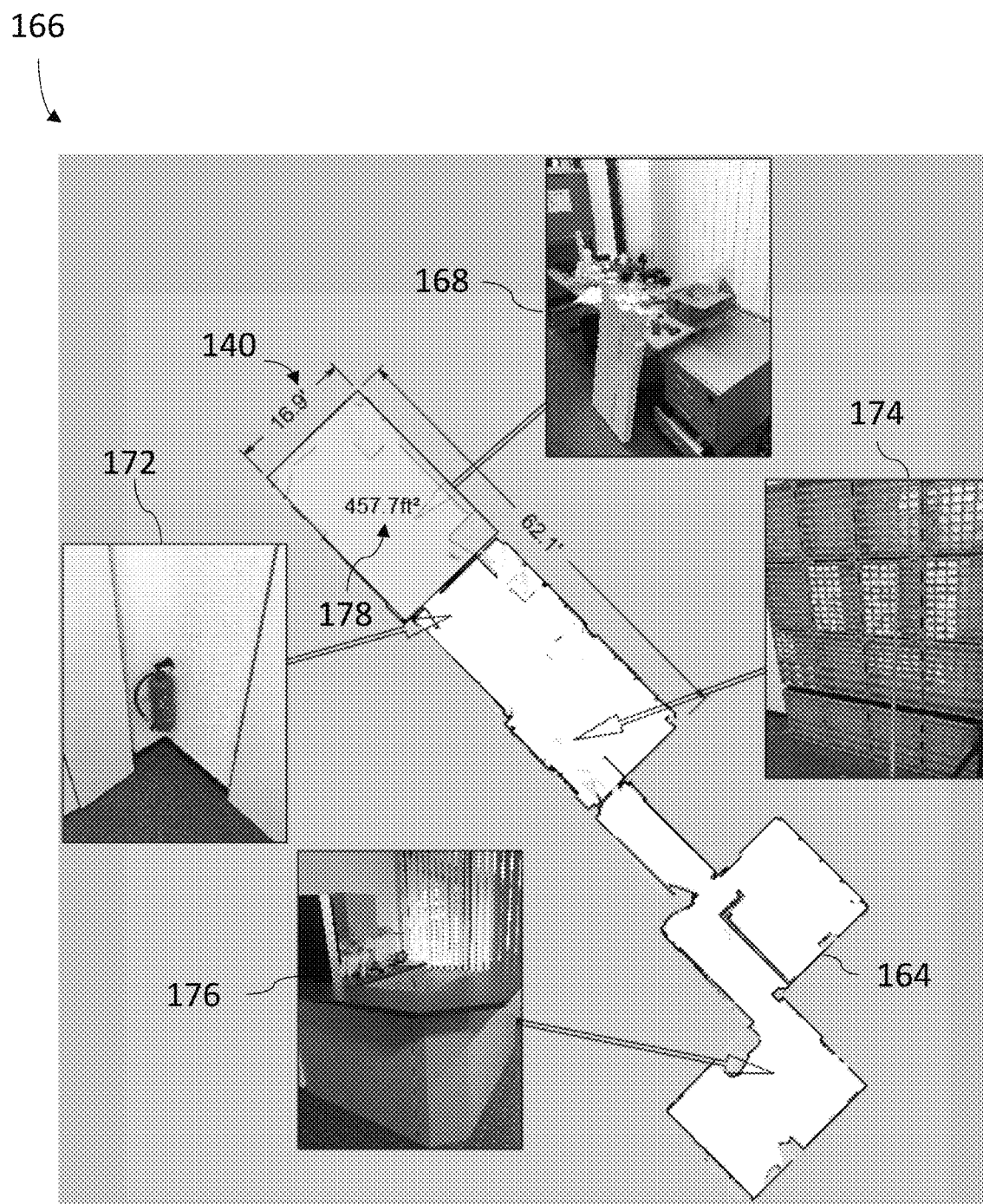
FIG. 15 is an annotated two-dimensional map generated with the method of FIG. 14 in accordance with an embodiment.

The method 150 then proceeds to block 156 where the images and notes are stored in memory, such as memory 80 for example. In an embodiment, the data on the pose of the system 30 is stored with the images and notes. In still another embodiment, the time or the location of the system 30 when the images are acquired or notes were recorded is also stored. Once the scanning of the area or facility is completed, the method 150 then proceeds to block 158 where the 2D map 164 (FIG. 15) is generated as described herein. The method 150 then proceeds to block 160 where an annotated 2D map 166 (FIG. 15) is generated. The annotated 2D map 166 may include user-defined annotations, such as dimensions 140 or room size 178 described herein above with respect to FIG. 12. The annotations may further include user-defined free-form text or hyperlinks for example. Further, in the exemplary embodiment, the acquired images 168 and recorded notes are integrated into the annotated 2D map 166. In an embodiment, the image annotations are positioned to the side of the 2D map 164 the image was acquired or the note recorded. It should be appreciated that the images allow the operator to provide information to the map user on the location of objects, obstructions and structures, such as but not limited to fire extinguisher 172, barrier 174 and counter/desk 176 for example. Finally, the method 150 proceeds to block 162 where the annotated map is stored in memory.

It should be appreciated that the image or note annotations may be advantageous in embodiments where the annotated 2D map 166 is generated for public safety personnel, such as a fire fighter for example. The images allow the fire fighter to anticipate obstructions that may not be seen in the limited visibility conditions such as during a fire in the facility. The image or note annotations may further be advantageous in police or criminal investigations for documenting a crime scene and allow the investigator to make contemporaneous notes on what they find while performing the scan.

Figure 16:
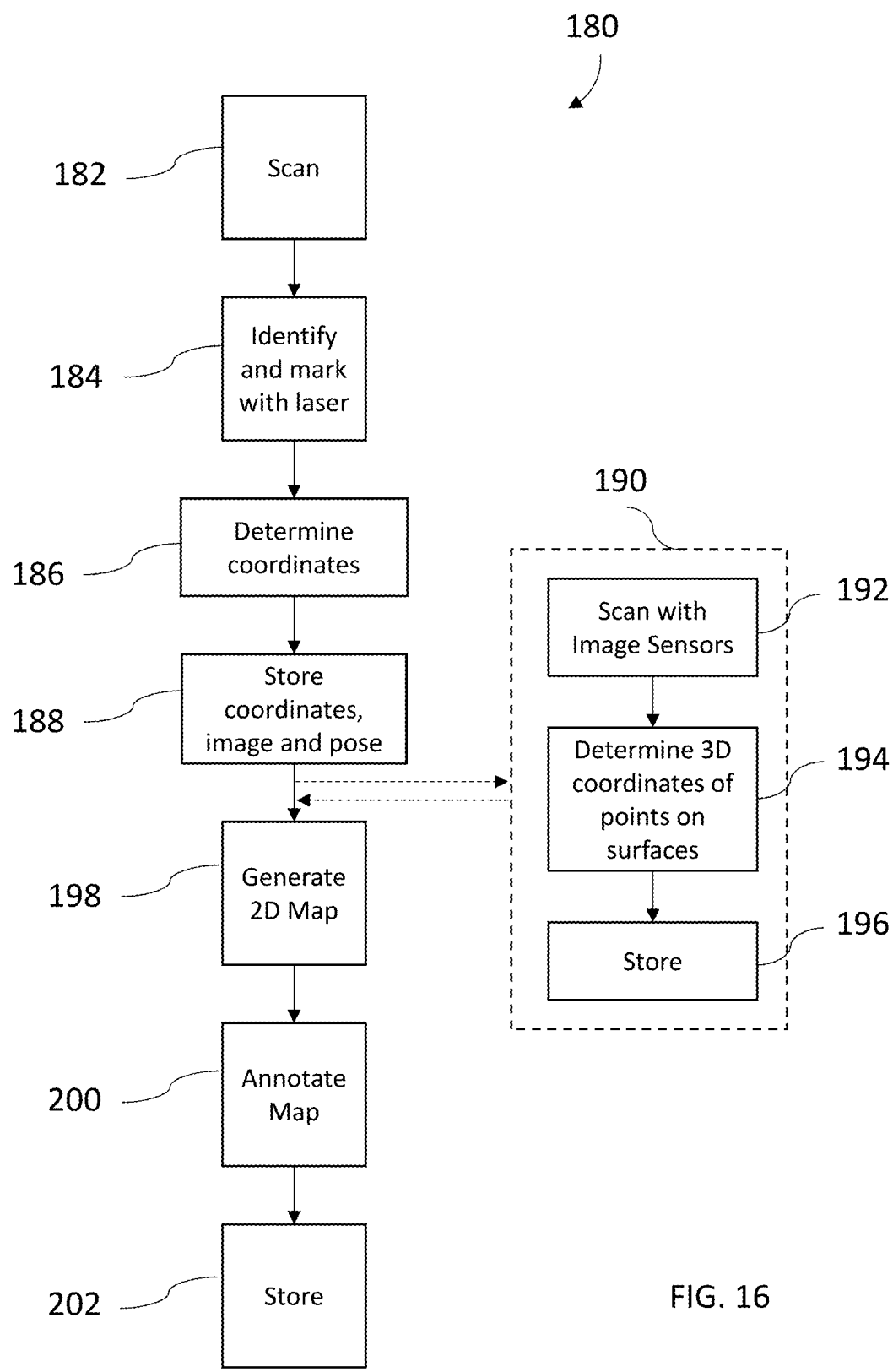
FIG. 16 is a flow diagram of a method of generating a two-dimensional map and a three-dimensional point cloud in accordance with an embodiment.
Figure 17:
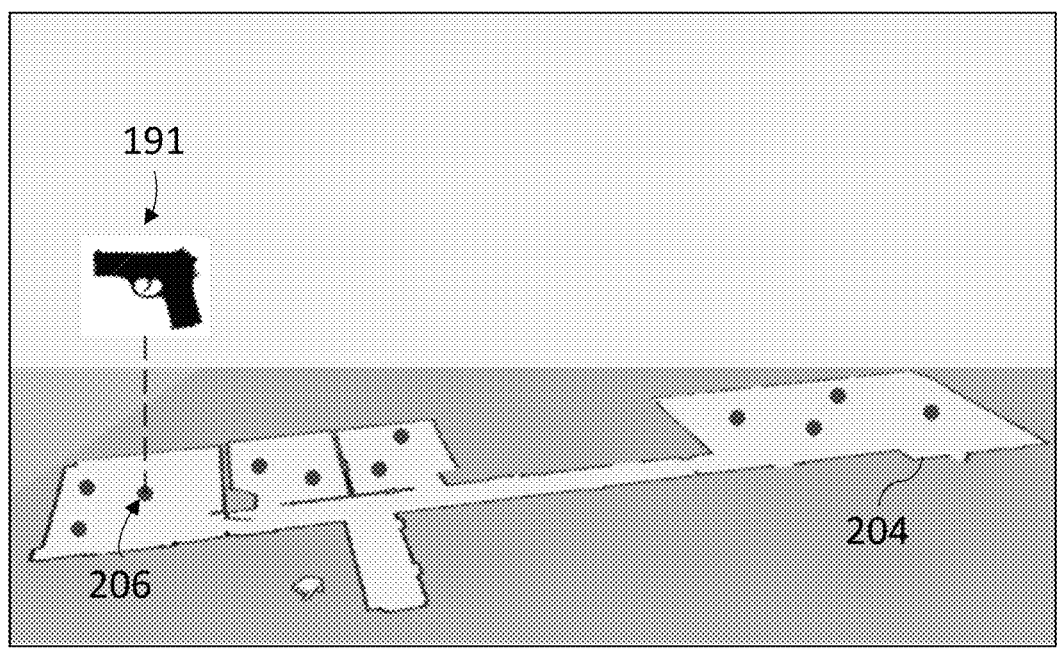
FIGS. 17-18 are views of annotated two-dimensional maps generated with the method of FIG. 16 in accordance with an embodiment.
Figure 18:
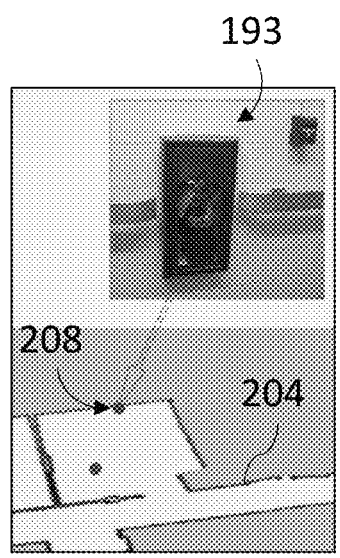
Figure 19:
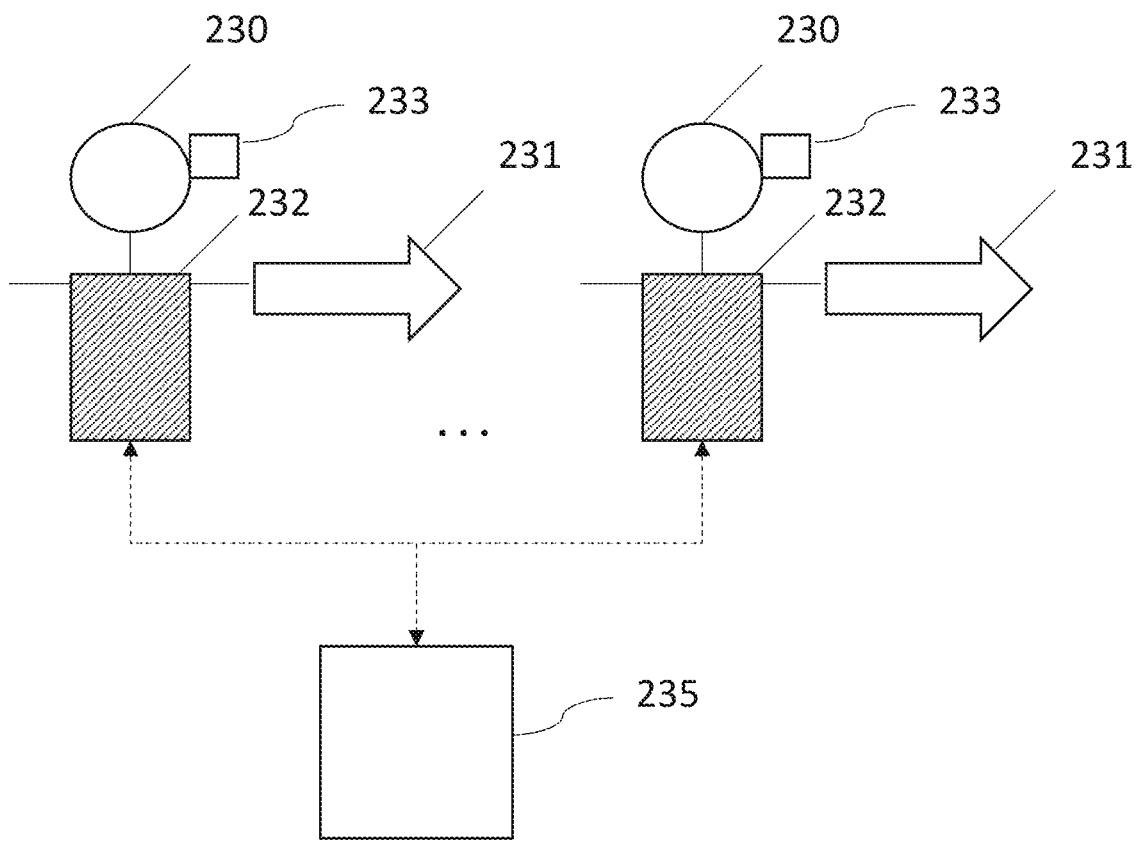
FIG. 19 is a scanning system that includes multiple scanners integrated with gear worn by field operators in accordance with an embodiment.

Referring now to FIG. 16, another method 180 is shown of generating a 2D map having annotation that include 3D coordinates of objects within the scanned area. The method 180 begins in block 182 with the operator 230 scarming the area. During the scanning process, the operator 230 may see an object, such as evidence 191 (FIG. 17) or equipment 193 (FIG. 18) for example, that the operator 230 may desire to locate more precisely within the 2D map or acquire additional information. In an embodiment, the system 30 includes a laser projector 76 (FIG. 1) that the operator 230 may activate. The laser projector 76 emits a visible beam of light that allows the operator 230 to see the direction the laser projector 76 is pointing. Once the operator 230 locates the light beam from laser projector 76 on the desired object, the method 180 proceeds to block 186 where the coordinates of the spot on the object of interest are determined. In one embodiment, the coordinates of the object are determined by first determining a distance from system 30 to the object. In an embodiment, this distance may be determined by a 3D camera 60 (FIG. 9) for example. In addition to the distance, the 3D camera 60 also may acquire an image of the object. Based on knowing the distance along with the pose of the system 30, the coordinates of the object may be determined. The method 180 then proceeds to block 188 where the information (e.g. coordinates and image) of the object are stored in memory.

It should be appreciated that in some embodiments, the operator 230 may desire to obtain a three-dimensional (3D) representation of the object of interest in addition to the location relative to the 2D map. In this embodiment, the method 180 proceeds to scanning block 190 and acquires 3D coordinates of points on the object of interest. In an embodiment, the object is scanned with the 3D camera 60 in block 192. The system 30 then proceeds to determine the 3D coordinates of points on the surface of the object or interest in block 194. In an embodiment, the 3D coordinates may be determined by determining the pose of the system 30 when the image is acquired by the 3D camera. The pose information along with the distances and a registration of the images acquired by the 3D camera may allow the generation of a 3D point cloud of the object of interest. In one embodiment, the orientation of the object of interest relative to the environment is also determined from the acquired images. This orientation information may also be stored and later used to accurately represent the object of interest on the 2D map. The method 180 then proceeds to block 196 where the 3D coordinate data is stored in memory.

The method 180 then proceeds to block 198 where the 2D map 204 (FIG. 17, FIG. 18) is generated as described herein. In an embodiment, the location of the objects of interest (determined in blocks 184-186) are displayed on the 2D map 204 as a symbol 206, such as a small circle for example. It should be appreciated that the 2D map 204 may include additional user-defined annotations added in block 200, such as those described herein with reference to FIG. 9 and FIG. 14. The 2D map 204 and the annotations are then stored in block 202.

In use, the map user may select one of the symbols, such as symbol 206 or symbol 208 for example. In response, an image of the object of interest 191, 193 may be displayed. Where the object or interest 191, 193 was scanned to obtain 3D coordinates of the object, the 3D representation of the object of interest 191, 193 may be displayed.

However, a technical challenge exists for users such as safety operators (police, firefighters, etc.) to document their operations during a mission and to obtain additional information about the environment in real time while the operation is being conducted, particularly, in the case of the mission being in an environment for which a floorplan is not available. In such cases, a safety operator may not be in a position to hold scanning system equipment that is presently available, which requires the operator to hold such scanning equipment in a hand or mount it on a cart and such, during the entire duration of their mission, and hence may have to sacrifice collecting the information that can prove to be mission critical during the ongoing mission itself, or at a future time. The technical solutions described herein address such technical challenges and facilitate generating a floorplan of an environment in real time and improving usability of the scanning system 30 to facilitate users such as the safety operators to acquire the scan data to generate the floorplan as they are completing the mission.

Figure 20:
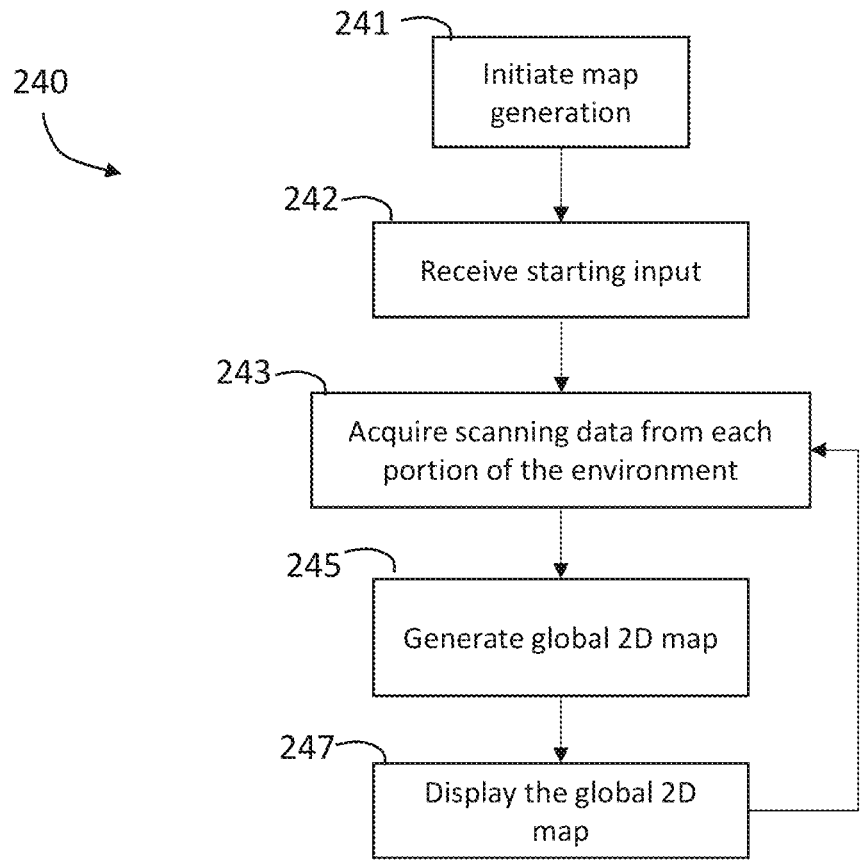
FIG. 20 is a flow diagram of a method of generating a two-dimensional global map using multiple scanners concurrently in accordance with an embodiment.

In typical scenarios, the aforementioned missions are not performed by a single operator 230 but by several operators 230 operating in a team (FIG. 20). Each operator 230 is equipped with a respective scanning system 30. The scanning system 30 is mounted to body armor, firearm, or any other equipment that an operator is carrying as described herein. Each scanning system 30 sends the respective scanning data to the centralized processor 235 that generates a floorplan by combining the scanning data from each respective scanning system 30. In one or more examples, a scanning system 30 generates a submap based on the scanning data from that scanning system 30, and the centralized processor 235 combines the submaps to build a global floorplan for the environment. The combining of the scanning data from each respective scanning system 30 can be done using simultaneous localization and mapping techniques, such as Kalman filtering, parallel tracking and mapping, and the like.

Figure 21:
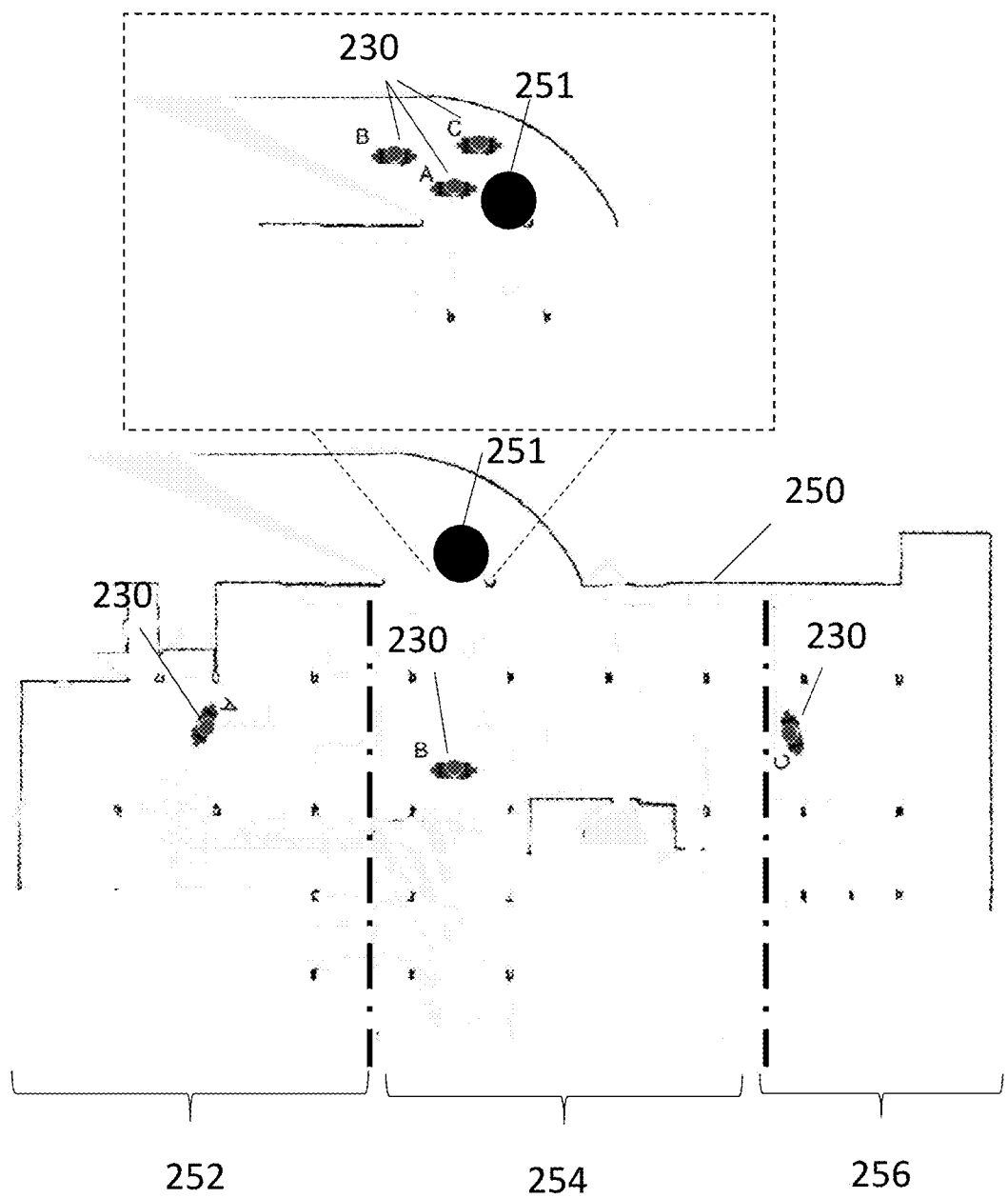
FIG. 21 is a view of an environment being scanned by multiple scanners in accordance with an embodiment.

FIG. 20 depicts a flowchart of an example method 240 for generating a global floorplan for an environment with multiple operators scanning separate portions of the environment using respective scanning systems according to one or more embodiments. The method 240 is initiated by indicating a starting point (location) from which the multiple operators 230 start scanning the environment, in block 241. FIG. 21 depicts an example scenario of the method 240 in practice. At initiation, all the operators 230 from the team start the mission from substantially the same starting position 251 (FIG. 21) of the environment 250 to be mapped. At the starting position, the map generated by each scanning system 30 is substantially the same because the operators 230 are all at the same starting position 251.

The method 240 further includes receiving a starting input, in block 242. The starting input can include receiving a direction in which all of the operators 230, at least those with the scanning systems 30, are headed in the environment. For example, in the scenario of FIG. 25, operator-A 230 heads toward a first portion 252, operator-B 230 heads toward a second portion 254, and operator-C 230 heads toward a third portion 256. The direction for each of the operators 230 can be provided as a direction vector, in one or more examples.

Figure 22A:
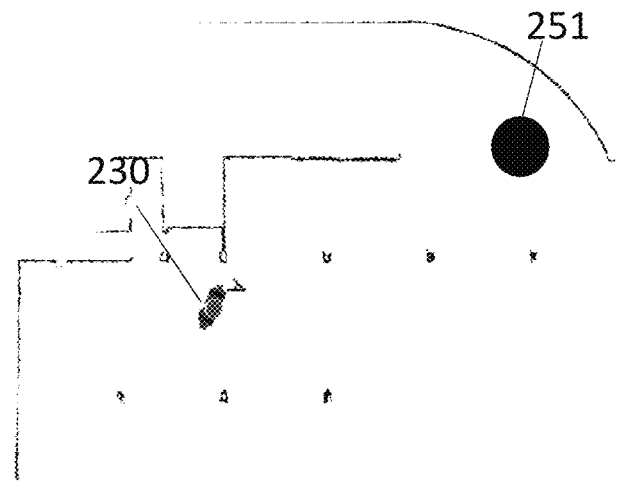
FIGS. 22A, 22B, and 22C are views of submaps being scanned by multiple scanners in accordance with an embodiment.
Figure 22B:
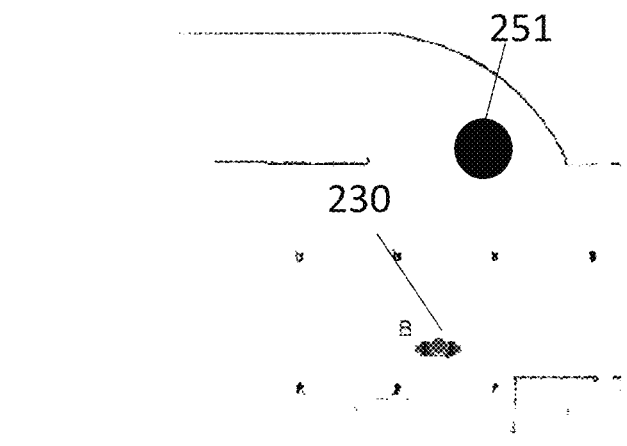
Figure 22C:
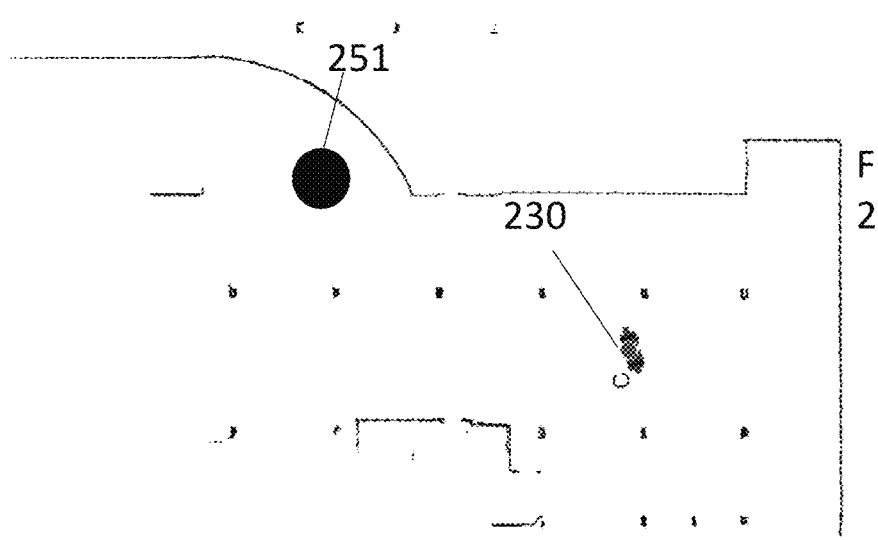

The method 240 further includes acquiring scanning data from each of the portions 252, 254, and 256, as the operators 230 move in the respective portions, in block 243. The data is acquired as described herein using the various components such as the 2D scanner 50 and IMU 74 (FIG. 1). The scanning data can include one or more annotations and points of interest as described herein (FIG. 14, FIG. 16). Using the acquired scan data, submaps are created for each of the portions 252, 254, and 256. In one or more examples, each of the scanning systems 30 integrated with the operator (s) 230 moving in the respective portions 252, 254, and 256, creates the corresponding submaps (FIG. 22A, 22B, 22C). Alternatively, the scanning data from each of the scanning systems 30 is sent to the central processor 235, which in turn generates a global floorplan for the environment 250 from the scanning data, in block 245. In one or more examples, the central processor 235 generates the submaps for the respective portions 252, 254, and 256, and subsequently combining the submaps into the global floorplan of the environment 250. Alternatively, in one or more examples, the scanning systems 30 send the respective submaps to the central processor 235, which combines the submaps to generate the global floorplan of the environment 250, in block 245. In one or more examples, the central processor 235 is a processor from one of the scanning systems 30 worn by the operators 230. Alternatively, the central processor 235 is a separate processor that can be onsite at the mission or at a different location altogether, such as a central server.

Combining the submaps to generate the global floorplan is performed using simultaneous localization and mapping using a particle filter, an incremental combining of the submaps, or any other technique. The submaps are aligned for being combined based on the starting point 251 in one or more examples. Alternatively, or in addition, the alignment of the submaps is performed using one or more overlapping regions from the submaps. The reference coordinate systems of the submaps are matched/registered with each other so that the submaps can be combined.

The alignment can be performed automatically using such features. For example, the geometrical structure of a submap is matched against second submap of a second data set until an overlay is reached within a predetermined probability threshold. In this embodiment a line matching methodology such as Iterative Closest Point (ICP) for example, may be used for the alignment of the data sets. Once the submap of the second data set is in the correct position the offset vector from the previous map origin to the new map origin is determined in the coordinate system of the previous map. This vector is automatically applied to all positions in the new map. This process may be repeated n times. At the end a complete global map is generated using the submaps.

In one or more examples, an operator aligns the submaps using the one or more common/overlapping features.

Once the global floorplan is generated, it is displayed to the operators 230, in block 247. Displaying the global floorplan includes transmitting the data for visualizing the global floorplan to the headgear 233 of the operators 230. The visualization can include an augmented reality view using a headgear such as a HOLOLENS™ or the like. The visualization can include the one or more annotations and/or points of interest that are added by one or more operators 230 to the scanning data. In one or more examples, the method continuously operates to generate an updated global floorplan as new scanning data is acquired by the scanning systems 30.

In one or more examples, the global map is concurrently displayed at a remote server, such as at a command center, and an operator at the remote server can annotate the global map. The annotations are transmitted to the field operators 230 via the scanning system and made visible to the operators 230 at run time, for example via the headgear 233. In addition, to the annotations, the operator(s) at the remote server can also provide directions, commands, and other such information either visually or in an audible form. Such data can be transmitted via the mesh network and/or an LTE or other wireless network.

Figure 23:
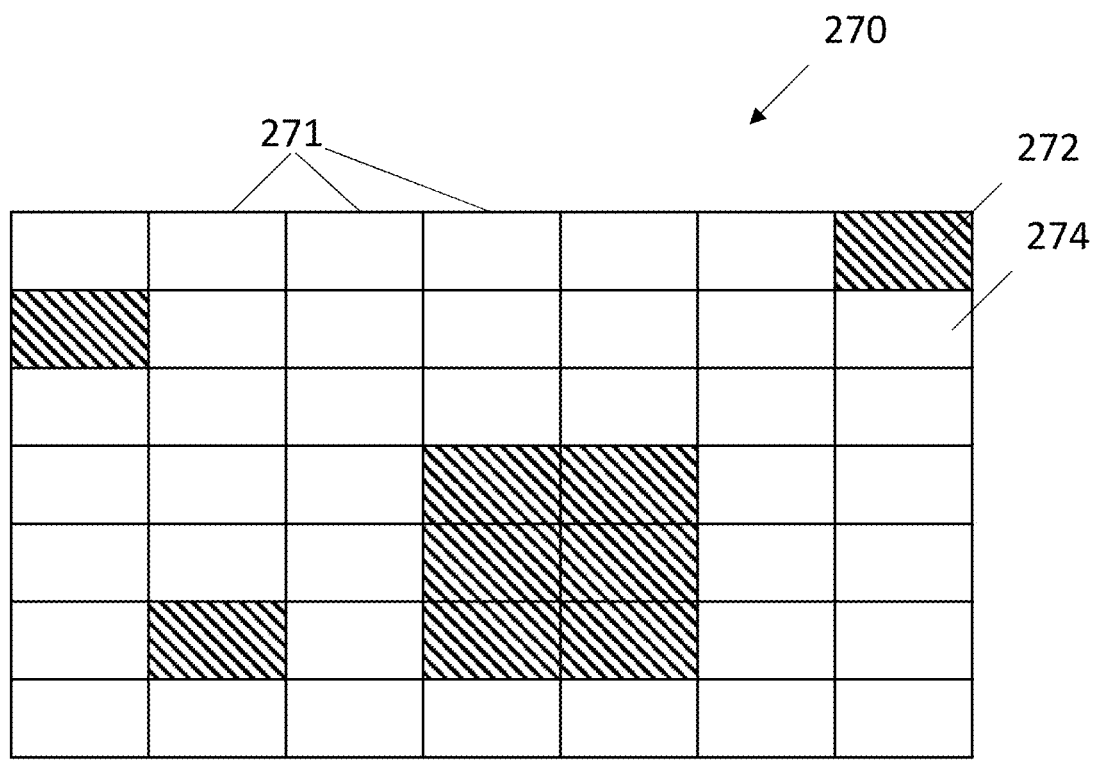
FIG. 23 is a view of an occupancy grid generated by multiple scanner devices in accordance with an embodiment.

In one or more examples, the global floorplan is an occupancy grid 270 of the environment 250 as shown in FIG. 23. It should be noted that the mapping is depicted for illustration purposes, and that the mapping may not be visually projected on the environment 250. Rather, the occupancy grid 270 shown in FIG. 2237 is a representation of an internal data structure of controller 68.

Mapping and generating the occupancy grid 270 includes using the position where the measurement workflow is started as the 'starting position' 251. Each scanning system 30 creates the occupancy grid using a predetermined resolution, and in one or more examples, the resolution is common among each of the scanning systems 30. In one or more examples, the system 30 determines the resolution based on its 3D position. Every time the 2D sensor gives a signal, the cell in the occupancy grid 270 is marked as occupied. Alternatively, the system 30 uses a threshold, e.g. the sensor has to deliver a feedback 20 times, or any other number of times, before a grid cell is marked as occupied.

Each operator 230 determines occupancy of the portion of the occupancy grid 270 that maps to the corresponding portion 252, 254, 256 of the environment 250 in which the operator 230 is moving. The operator 230 moves, in turn moving the scanner 30 in order to cover the portion (252, 254, 256). In one or more examples, the 3D pose estimation obtained from the combination of the scanner 30 with the IMU 74 facilitates in determining occupancy of a cell 271 of the occupancy grid 270, which is based on the projection of the scanner pose on the floor plane. The scanner 30 identifies cells 272 that are mapped and in which elements, such as tables, chairs, walls, or any other objects are detected. In one or more examples, the "occupied" cells 272 are denoted using a color, pattern, or any other visual indication that is different from an "unoccupied" or "empty" cell 274. It should be noted that the occupancy grid resolution in FIG. 23 is illustrative only, and that the grid resolution can be calibrated by the operators 230 based on how much accuracy is desired. For example, the grid resolution can be of an order of a centimeter, that is each cell is 1 cm×1 cm. In other examples, the grid resolution can be different.

In one or more examples, the scanning system 30 uses the sensor 61 to detect if a grid is occupied by detecting an object (or part thereof) such as a chair, a table, a canister, a wall, a desk, a door, or any other such element inside the environment 250. The sensor 61 can detect the objects using ultrasound, thermal imaging, radio waves, camera, or any other such computer vision techniques. For example, the sensor 61 is a thermal imaging system that uses infrared sensing that detects if the object (or a part thereof) exists in each of the cells 271. The occupancy grid 270 is stored and associated with the coordinates of the environment 250 and made accessible for the operators 230 (or other users) to view via the user interface of the scanning systems 30, or any other user device.

In one or more examples, the occupancy grid 270 is stored as a matrix G, and each position G(i, j) is updated to indicate the occupancy of an object in the environment 250. The number of positions in the matrix G are based on the resolution of the sensor 61. Each operator 230 sends a portion of the matrix G and the acquired data from each operator 230 is combined to form the occupancy grid matrix. In one or more examples, in case of a conflicting information from scanning systems 20 corresponding to different operators 230, the cell 271 is indicated as being occupied.

It should be appreciated that the occupancy grid 270 and a 2D floorplan are both generated for the environment 250 in one or more examples. Further, because the occupancy grid 270 is associated with the environment 250, the location of the objects in the occupancy grid 270 are displayed on the user interface of the scanning system 30 (e.g. via the headgear 233), or any other suitable device that has received the generated 2D map. The display of the occupancy grid 270 or the cells 271 on the user interface may be in the form of an augmented reality display. In other words, when the operator points a device such as a camera, mobile phone, or the like at the environment 250, the cells 271 are displayed on the user interface so that the operator may determine the locations of objects in the environment 250, or at least know which parts of the environment 250 are occupied. Such information can be invaluable during missions, such as a search and rescue during a fire, earthquake, etc.

Alternatively, or in addition, the occupancy grid 270 that is generated can be saved as the annotations for the global 2D map. Further, in one or more examples, the operator can further embellish the annotations, for example by adding more details, such as text/images 111, changing the typeface, color, and other attributes of the occupancy grid 270.

It should be noted that although the above example describes the occupancy grid 270 being generated using multiple scanning systems 30 being carried by corresponding operators 230, in one or more examples, a single operator 230 can be moving across the environment 250 and the occupancy grid 270 (and the global floorplan) can be generated based on the scanned data acquired by the single operator 230 in such a case.

Accordingly, the technical solutions described herein facilitate generating a 2D floorplan or a 2D map of an environment dynamically using multiple scanning systems operating cooperatively. The scanning systems can be wearable systems that are integrated in the gear used by one or more operators that are moving in the environment in designated portions of the environment. The multiple scanning systems acquire data for generating submaps corresponding to the various portions, and the submaps are combined by a central processor to generate a global map.

In one or more examples, all the maps of each mapping device plus their locations are sent to a remote server via LTE or other wireless communication protocol. The remote server is responsible to fuse the maps based on the initial positions of each device and sends back a global map to each mapping device. Accordingly, in particular example scenario of a team of operators operating in an unknown environment, when the team splits, a floorplan of the overall environment is not only generated faster, but also the team members get to know how the environment looks like and which areas were already visited. Additionally, all the floor plans are being automatically documented. In the case the central processor is a remote server, an emergency team at the remote location can also visualize almost the entire operation and take dynamic decisions based on the map and data being acquired and transmitted by the multiple scanning systems. In one or more examples, an operator at the remote server can annotate the global map, the annotations being visible to the field operators dynamically.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system of generating a two-dimensional (2D) image of an environment, the system comprising:
   a 2D scanner system comprising:
      a measurement device that is mounted to a first body equipment of an operator, the measurement device comprising a light source, an image sensor, and a controller, wherein, the light source steers a beam of light within a first plane to illuminate object points in the environment, the image sensor is arranged to receive light reflected from the object points, the controller being operable to determine a distance value to at least one of the object points; and
      one or more processors that are mounted to a second body equipment of the operator, the one or more processors are operably coupled to the 2D scanner system, the one or more processors being responsive to non-transitory executable instructions for:
generating a 2D submap of the environment in response to an activation signal from the operator and based at least in part on the distance value, each submap generated from a respective point in the environment; and
generating the 2D image of the environment using the 2D submaps.

2. The system of claim 1, wherein the 2D submaps are for distinct portions of the environment.

3. The system of claim 1, wherein the measurement device is mounted to a first shoulder of the operator, and the one or more processors are mounted to a back of the operator.

4. The system of claim 1, further comprising a headgear for visualizing the 2D image of the environment in an augmented reality view.

5. The system of claim 4, wherein the augmented reality view comprises an occupancy grid being mapped to the 2D image of the environment.

6. The system of claim 4, wherein augmented reality view comprises an annotation being shown at coordinates corresponding to a predetermined location in the environment, the predetermined location having a point of interest for an operator of the system.

7. The system of claim 1, wherein the measurement device is mounted on a firearm of the operator.

8. A method for generating a two-dimensional (2D) image of an environment, the method comprising:
integrating a 2D scanner system into a gear worn by an operator, the 2D scanner system comprising:
a measurement device that is mounted to a first body equipment of an operator, the measurement device comprising a light source, an image sensor, and a controller; and
one or more processors that are mounted to a second body equipment of the operator, the one or more processors are operably coupled to the measurement device;
moving the measurement device to a plurality of registration positions in the environment;
sweeping a beam of light, by the measurement device, in a horizontal plane at each of the plurality of registration positions;
obtaining by the 2D scanner system a plurality of 2D submaps, each of the plurality of submaps being a set of 2D coordinates of points in the environment, each of the plurality of submaps being collected by the 2D scanner system at a different position relative to a first registration position; and
generating, by the one or more processors, a 2D image of the environment based at least in part on the plurality of 2D submaps.

9. The method of claim 8, wherein the 2D submaps are for distinct portions of the environment.

10. The method of claim 8, wherein the measurement device is mounted to a first shoulder of the operator, and the one or more processors are mounted to a back of the operator.

11. The method of claim 8, wherein the body equipment further comprises a headgear for visualizing images; and the method further comprising:
transmitting, by the one or more processors, the 2D image to the headgear of the operator for visualizing the 2D image in an augmented reality view.

12. The method of claim 11, wherein the augmented reality view comprises an occupancy grid being mapped to the 2D image of the environment.

13. The method of claim 8, further comprising:
emitting a visible laser light beam from a laser projector onto a point on an object, the laser projector being coupled to the measurement device;
measuring a distance from the measurement device to the point on the object using a three-dimensional camera coupled to the measurement device; and
annotating the 2D image to include a position of the point on the object based at least in part on the distance.

14. The method of claim 8, further comprising:
coupling for communication a portable computing device to the measurement device, the portable computing device having an image sensor, the portable computing device mounted to a third body equipment of the operator;
acquiring a first image with the image sensor;
transmitting the first image to the measurement device; and
annotating the 2D image to include the first image, wherein a position of the first image in the 2D image is based at least in part on a device position of the measurement device when the first image is acquired by the image sensor.

15. A computer program product comprising a memory device having computer executable instructions stored thereon, the computer executable instructions when executed by one or more processors perform a method to generate a two-dimensional (2D) image of an environment, the method comprising:
integrating a 2D scanner system into a gear worn by an operator, the 2D scanner system comprising:
a measurement device that is mounted to a first body equipment of an operator, the measurement device comprising a light source, an image sensor, and a controller; and
one or more processors that are mounted to a second body equipment of the operator, the one or more processors are operably coupled to the measurement device;
moving the measurement device to a plurality of registration positions in the environment;
sweeping a beam of light, by the measurement device, in a horizontal plane at each of the plurality of registration positions;
obtaining by the 2D scanner system a plurality of 2D submaps, each of the plurality of submaps being a set of 2D coordinates of points in the environment, each of the plurality of submaps being collected by the 2D scanner system at a different position relative to a first registration position; and
generating, by the one or more processors, a 2D image of the environment based at least in part on the plurality of 2D submaps.

16. The computer program product of claim 15, wherein the measurement device is mounted to a first shoulder of the operator, and the one or more processors are mounted to a back of the operator.

17. The computer program product of claim 15, wherein the body equipment further comprises a headgear for visualizing images; and the method further comprising:
transmitting, by the one or more processors, the 2D image to the headgear of the operator for visualizing the 2D image in an augmented reality view.

18. The computer program product of claim 17, wherein the augmented reality view comprises an occupancy grid being mapped to the 2D image of the environment.

19. The computer program product of claim 18, the method further comprising:
coupling for communication a portable computing device to the measurement device, the portable computing device having an image sensor, the portable computing device mounted to a third body equipment of the operator;
acquiring a first image with the image sensor;
transmitting the first image to the measurement device; and
annotating the 2D image to include the first image, wherein a position of the first image in the 2D image is based at least in part on a device position of the measurement device when the first image is acquired by the image sensor.

20. The computer program product of claim 15, the method further comprising:
emitting a visible laser light beam from a laser projector onto a point on an object, the laser projector being coupled to the measurement device;
measuring a distance from the measurement device to the point on the object using a three-dimensional camera coupled to the measurement device; and
annotating the 2D image to include a position of the point on the object based at least in part on the distance.

* * * * *